(12) United States Patent
Seo

(10) Patent No.: US 12,542,977 B2
(45) Date of Patent: Feb. 3, 2026

(54) IMAGING DEVICE FOR PERFORMING FOCUS ADJUSTMENT OF OPTICAL SYSTEM

(71) Applicant: NIKON CORPORATION, Tokyo (JP)

(72) Inventor: Takashi Seo, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 18/773,794

(22) Filed: Jul. 16, 2024

(65) Prior Publication Data

US 2024/0373133 A1 Nov. 7, 2024

Related U.S. Application Data

(63) Continuation of application No. 18/370,950, filed on Sep. 21, 2023, now Pat. No. 12,075,169, which is a
(Continued)

(30) Foreign Application Priority Data

Apr. 5, 2017 (JP) ................................ 2017-075177

(51) Int. Cl.
*H04N 23/75* (2023.01)

(52) U.S. Cl.
CPC .................................. *H04N 23/75* (2023.01)

(58) Field of Classification Search
CPC .... H04N 23/75; H04N 23/672; H04N 23/667; H04N 25/704; H04N 25/77; G02B 7/34; G03B 13/36
See application file for complete search history.

(56) References Cited

U.S. PATENT DOCUMENTS 9,641,780 B2 * 5/2017 Ishiwata ................ H04N 25/46
10,154,214 B2 * 12/2018 Liim ..................... H04N 25/618
(Continued)

FOREIGN PATENT DOCUMENTS

| JP | 2012-191401 A | 10/2012 |
| JP | 2016-127454 A | 7/2016 |
| JP | 2017-055328 A | 3/2017 |

OTHER PUBLICATIONS

Jun. 26, 2018 International Search Report issued in International Patent Application No. PCT/JP2018/013712.
(Continued)

*Primary Examiner* — Chiawei Chen
(74) *Attorney, Agent, or Firm* — Oliff PLC

(57) ABSTRACT

An image sensor includes: a first and a second pixel, each of which includes a first photoelectric conversion unit that photoelectrically converts light that has passed through a micro lens and generates a first charge, a second photoelectric conversion unit that photoelectrically converts light that has passed through the micro lens and generates a second charge, an accumulation unit that accumulates at least one of the first charge and the second charge, a first transfer unit that transfers the first charge to the accumulation unit, and a second transfer unit that transfers the second charge to the accumulation unit; and a control unit that outputs, to the first transfer unit of the first pixel and to the second transfer unit of the second pixel, a signal that causes the first charge of the first pixel and the second charge of the second pixel to be transferred to their accumulation units.

10 Claims, 18 Drawing Sheets

Related U.S. Application Data continuation of application No. 17/584,491, filed on Jan. 26, 2022, now Pat. No. 11,792,533, which is a continuation of application No. 16/500,927, filed as application No. PCT/JP2018/013712 on Mar. 30, 2018, now Pat. No. 11,272,122.

(56) References Cited

U.S. PATENT DOCUMENTS

| | | | | |
|---|---|---|---|---|
| 10,270,999 | B2* | 4/2019 | Kusaka | H10F 39/8063 |
| 10,334,191 | B1* | 6/2019 | Yang | H10F 39/8037 |
| 10,462,391 | B2* | 10/2019 | Chuang | H04N 25/68 |
| 11,272,122 | B2* | 3/2022 | Seo | H04N 23/75 |
| 2007/0102619 | A1* | 5/2007 | Kusaka | G02B 7/285 |
| | | | | 250/201.2 |
| 2008/0074534 | A1* | 3/2008 | Kusaka | H04N 23/63 |
| | | | | 348/E5.04 |
| 2008/0258039 | A1* | 10/2008 | Kusaka | G03B 13/36 |
| | | | | 250/201.8 |
| 2009/0096886 | A1* | 4/2009 | Kusaka | H04N 25/704 |
| | | | | 348/346 |
| 2013/0107067 | A1* | 5/2013 | Miyakoshi | H04N 25/704 |
| | | | | 348/208.5 |
| 2013/0194471 | A1* | 8/2013 | Yamashita | H10F 39/813 |
| | | | | 348/308 |
| 2015/0138410 | A1* | 5/2015 | Dai | H04N 25/778 |
| | | | | 348/308 |
| 2016/0028974 | A1* | 1/2016 | Guidash | H04N 25/616 |
| | | | | 348/294 |
| 2016/0086991 | A1* | 3/2016 | Nomura | H10F 39/807 |
| | | | | 257/432 |
| 2016/0127669 | A1* | 5/2016 | Yamazaki | H04N 25/778 |
| | | | | 348/300 |
| 2016/0198109 | A1 | 7/2016 | Ishii et al. | |
| 2016/0353040 | A1* | 12/2016 | Yamashita | H10F 39/813 |
| 2017/0078594 | A1* | 3/2017 | Kawabata | H04N 25/533 |
| 2017/0142353 | A1* | 5/2017 | Tadmor | H04N 25/73 |
| 2017/0301718 | A1* | 10/2017 | Chou | H04N 25/704 |
| 2018/0176498 | A1* | 6/2018 | Elkhatib | H04N 25/771 |
| 2018/0197910 | A1* | 7/2018 | Lee | H10F 39/803 |
| 2020/0339245 | A1* | 10/2020 | Ishiwata | H04N 25/46 |

OTHER PUBLICATIONS

Nov. 10, 2020 Office Action issued in Japanese Patent Application No. 2019-511204.
Feb. 25, 2021 Office Action Issued in U.S. Appl. No. 16/500,927.
Apr. 21, 2021 Office Action issued in Chinese Patent Application No. 201880023716.X.
Oct. 25, 2021 Notice of Allowance issued in U.S. Appl. No. 16/500,927.
Apr. 16, 2024 Notice of Allowance issued in U.S. Appl. No. 18/370,950.
Sep. 20, 2022 Office Action issued in U.S. Appl. No. 17/584,491.
Mar. 28, 2023 Notice of Reasons for Revocation in Japanese Patent Application No. 2021-075894.
May 2, 2023 Office Action issued in U.S. Appl. No. 17/584,491.
Jun. 13, 2023 Notice of Allowance Issued in U.S. Appl. No. 17/584,491.
Dec. 20, 2023 Office Action issued in Japanese Patent Application No. 2021-075894.

\* cited by examiner

FIG.10

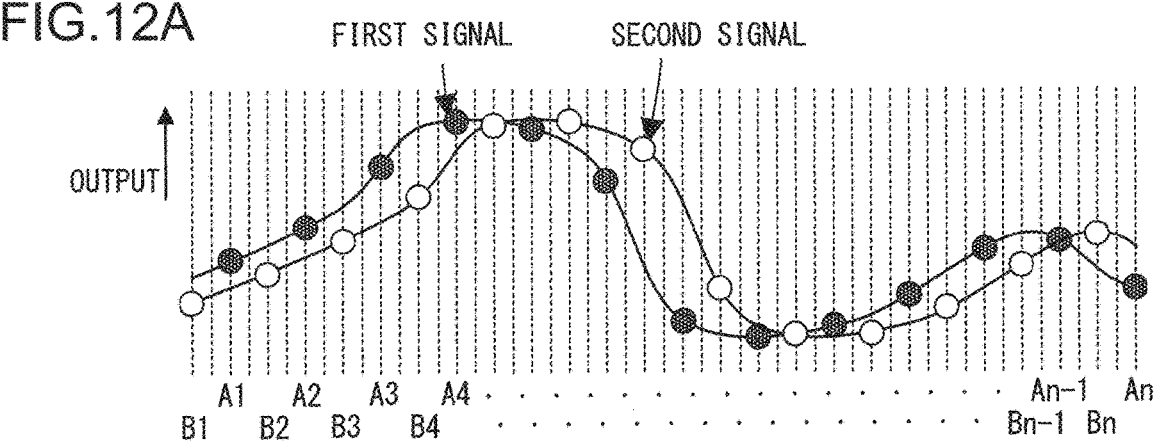
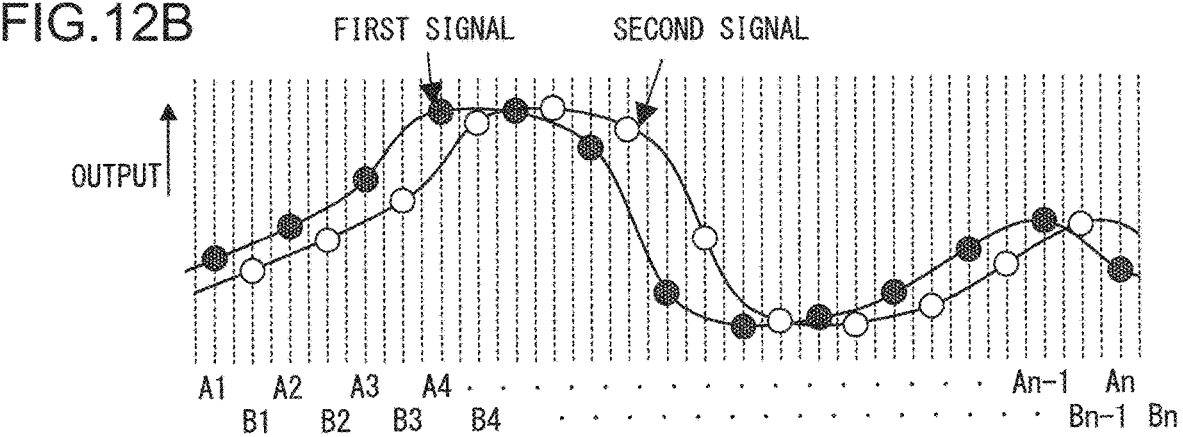

FIG.13

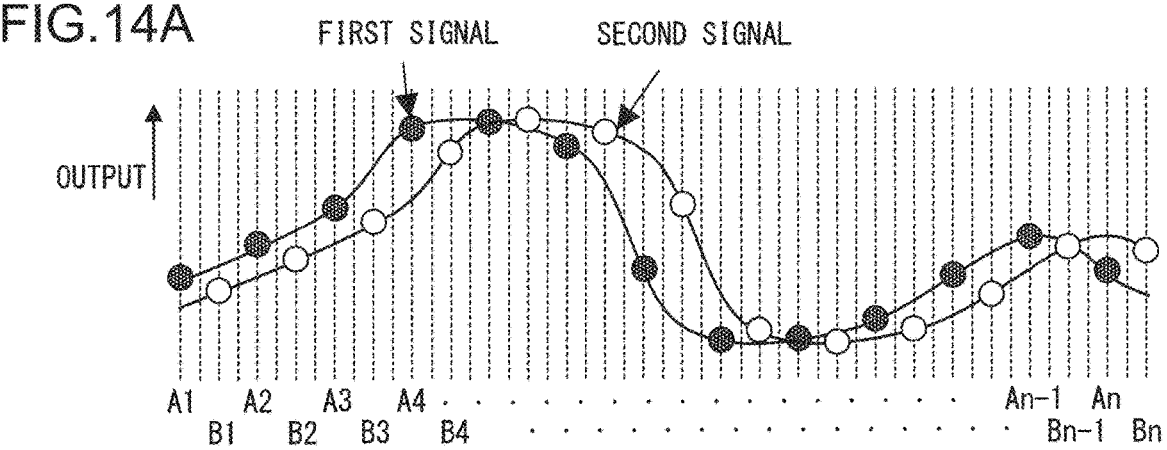
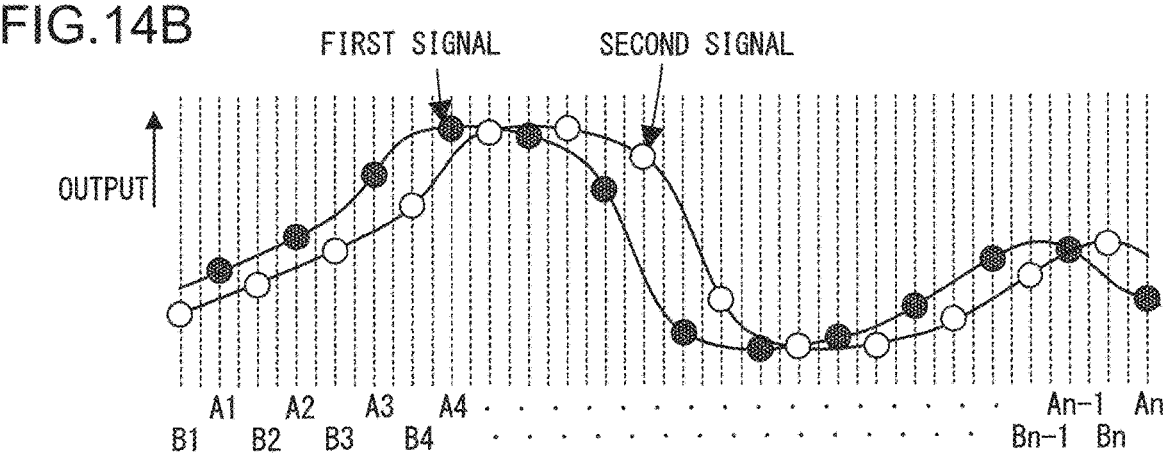
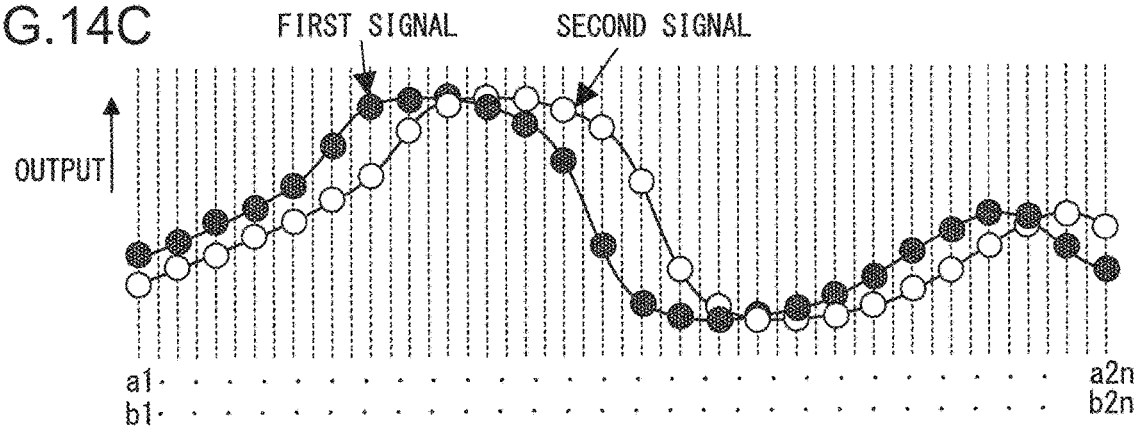

IMAGING DEVICE FOR PERFORMING FOCUS ADJUSTMENT OF OPTICAL SYSTEM

This is a Continuation of application Ser. No. 18/370,950 filed Sep. 21, 2023, which is a Continuation of application Ser. No. 17/584,491 filed Jan. 26, 2022, which is a Continuation of application Ser. No. 16/500,927 filed Oct. 4, 2019, which is a National Stage Application of PCT/JP2018/013712 filed Mar. 30, 2018, which in turn claims priority to Japanese Application No. 2017-075177 filed Apr. 5, 2017. The entire disclosures of the prior applications are hereby incorporated by reference herein in their entireties.

TECHNICAL FIELD

The present invention relates to an image sensor and to an imaging device.

BACKGROUND ART

An image sensor is per se known that reads out signals produced by a plurality of photoelectric conversion units, from pixels that incorporate that plurality of photoelectric conversion units and a plurality of floating diffusion units (refer to PTL1). In the prior art, each of the plurality of photoelectric conversion units is connected to a corresponding one of the plurality of floating diffusion units.

CITATION LIST

Patent Literature

PTL1: Japanese Laid-Open Patent Publication No. 2016-127454.

SUMMARY OF INVENTION

According to the 1st aspect of the present invention, an image sensor comprises: a first pixel and a second pixel, each of which comprises a first photoelectric conversion unit that photoelectrically converts light that has passed through a micro lens and generates a first charge, a second photoelectric conversion unit that photoelectrically converts light that has passed through the micro lens and generates a second charge, an accumulation unit that accumulates at least one of the first charge and the second charge, a first transfer unit that transfers the first charge to the accumulation unit, and a second transfer unit that transfers the second charge to the accumulation unit; and a control unit that outputs, to the first transfer unit of the first pixel and to the second transfer unit of the second pixel, a signal that causes the first charge of the first pixel and the second charge of the second pixel to be transferred to their accumulation units.

According to the 2nd aspect of the present invention, an imaging device comprises: an image sensor according to the 1st aspect that captures an image formed by an optical system comprising a focus adjustment optical system; and a position control unit that controls a position of the focus adjustment optical system based upon a signal based upon a first charge and a signal based upon a second charge outputted respectively from the first pixel and from the second pixel of the image sensor, so that an image formed by the optical system is focused upon the image sensor.

According to the 3rd aspect of the present invention, an imaging device comprises: an image sensor according to the 1st aspect that captures an image formed by an optical system comprising a focus adjustment optical system; and a position control unit that controls a position of the focus adjustment optical system based upon at least one set of a signal based upon the first charge of the first pixel and a signal based upon the second charge of the second pixel, and a signal based upon the second charge of the first pixel and a signal based upon the first charge of the second pixel, outputted from the image sensor, so that an image formed by the optical system is focused upon the image sensor.

BRIEF DESCRIPTION OF DRAWINGS

FIG. 10 is a figure showing an example of a pixel arrangement in a third embodiment;

FIGS. 12A and 12B are figures each showing an example of group "a" signals and group "b" signals, in this third embodiment;

FIG. 13 is a figure showing an example of a pixel arrangement in a first variant of the third embodiment;

FIGS. 14A through 14C are figures each showing an example of group "a" signals and group "b" signals, in a fourth embodiment;

DESCRIPTION OF EMBODIMENTS

Embodiments of the present invention will now be explained with reference to the drawings.

The First Embodiment

Figure 1:
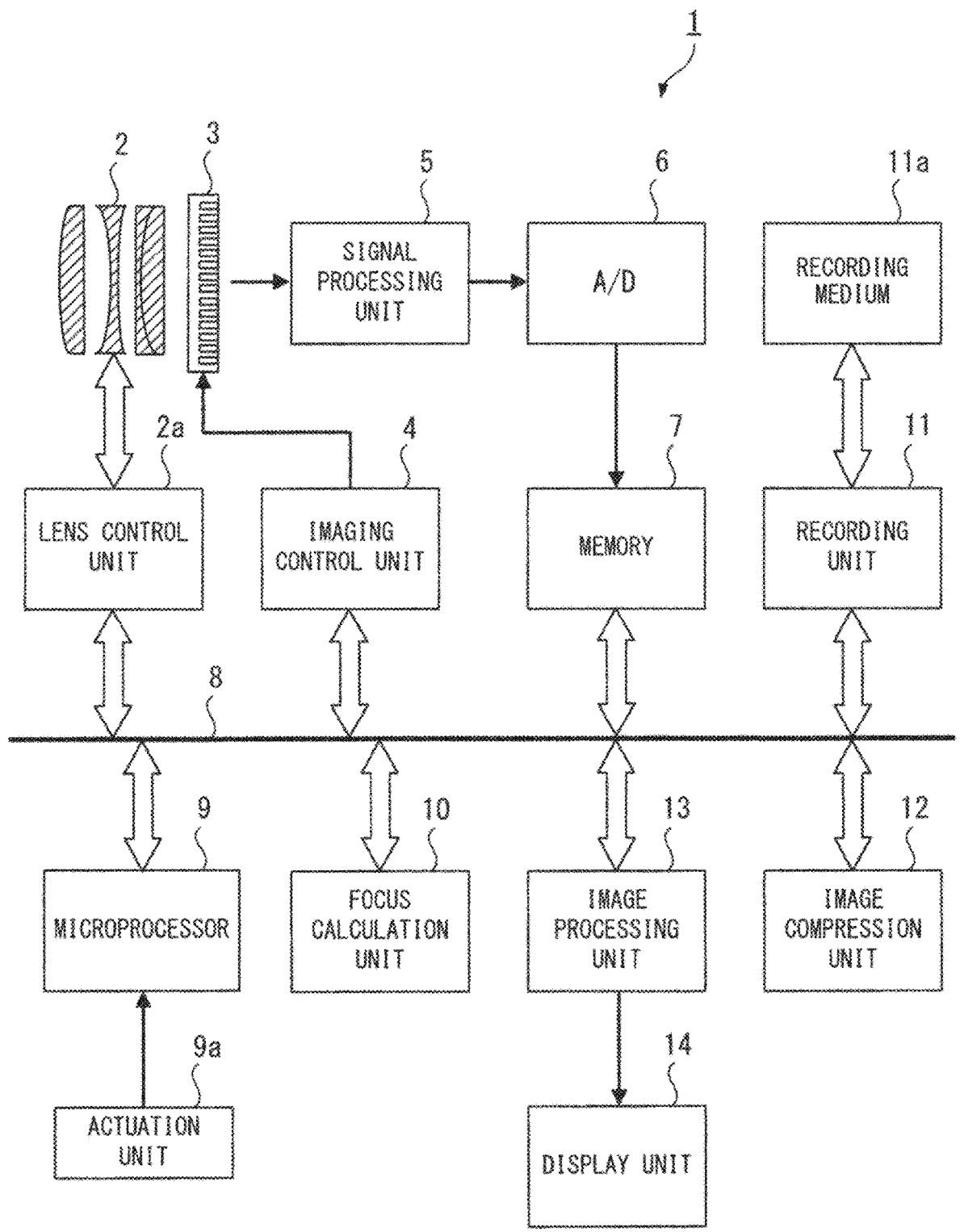
FIG. 1 is a block diagram showing an example of a camera according to a first embodiment.

FIG. 1 is a block diagram showing an example of a digital camera 1 (hereinafter termed the "camera"), that is provided with a focus detection device employing a solid-state image sensor (a solid-state imaging element) 3 (hereinafter termed the "image sensor") according to a first embodiment of the present invention.

In this first embodiment, an example of an interchangeable lens type camera 1 of a single lens reflex type or a mirrorless type is explained, but the camera could also not be of an interchangeable lens type. For example, the camera, which fundamentally is an imaging device (an image-capturing device), may be built as an integrated lens type camera or as a camera mounted to a portable terminal such as a smart phone or the like. Moreover, the camera is not limited to performing still imaging; it could also be built as an imaging device such as a video camera, a mobile camera, or the like that captures video images.

Structure of the Camera

A photographic lens 2 is mounted to the camera 1, and serves as an image capturing optical system. This photographic lens 2 has a focusing lens and an aperture. The focusing lens and the aperture of the photographic lens 2 are controlled by a lens control unit 2a that receives commands from a microprocessor 9. The photographic lens 2 forms an optical image (i.e. an image of the photographic subject) upon the imaging surface of an image sensor 3. The photographic lens 2 is also sometimes termed an "image formation optical system".

The image sensor 3 has a plurality of pixels. As will be described hereinafter, each of the plurality of pixels incorporates two photoelectric conversion units, each of which photoelectrically converts incident light and generates charge. Each of the plurality of pixels photoelectrically converts light that has passed through the photographic lens 2. And each of the plurality of pixels outputs signals based upon the charges that have been generated by photoelectric conversion. The image sensor 3 is controlled by an imaging control unit 4 that receives commands from the microprocessor 9. The signals that are outputted from the plurality of pixels comprised in the image sensor 3 are temporarily stored in a memory 7, after having been processed via a signal processing unit 5 and an A/D conversion unit 6. The lens control unit 2a, the imaging control unit 4, the memory 7, the microprocessor 9, a focus calculation unit (i.e. a focus detection processing unit) 10, a recording unit 11, an image compression unit 12, an image processing unit 13, and so on are connected together by a bus 8.

It should be understood that it would also be acceptable to arrange for the image sensor 3 to include some or all of the signal processing unit 5, the A/D conversion unit 6, and the memory 7. The image sensor 3 could also be made by laminating together at least one of the signal processing unit 5, the A/D conversion unit 6 and the memory 7, and the plurality of pixels.

Actuation signals are inputted to the microprocessor 9 from an actuation unit 9a such as a release button and so on. The microprocessor 9 sends commands to the various blocks on the basis of these actuation signals, and thereby controls the camera 1.

On the basis of the signals from the pixels included in the image sensor 3, the focus calculation unit 10 calculates the focus adjustment state of the photographic lens 2 according to the pupil-split type phase difference detection method. And, on the basis of signals based upon charges generated by first and second photodiodes PD-1 and PD-2 included in pixels 20 all of which will be described hereinafter, the focus detection unit 10 calculates a focusing position for the focusing lens for focusing an image produced by the photographic lens 2 upon the imaging surface of the image sensor 3. In concrete terms, the amount of deviation of images due to a plurality of ray bundles that have passed through different regions of the pupil of the photographic lens 2 is detected, and a defocusing amount is calculated on the basis of this amount of image deviation that has been detected. This defocusing amount represents the amount of deviation between the image focusing surface at which the image produced by the photographic lens 2 is formed, and the imaging surface of the image sensor 3. Since this calculation of the defocusing amount by the phase difference detection method is per se known, accordingly detailed explanation thereof will be curtailed. The focus calculation unit 10 calculates the amount by which the focusing lens is to be shifted to its focused position on the basis of the defocusing amount that has thus been calculated.

The microprocessor 9 sends the shifting amount of the focusing lens that has thus been calculated to the lens control unit 2a, along with a command for shifting of the focusing lens according thereto. Due to this, focus adjustment is performed automatically. The focus calculation unit 10, the microprocessor 9, and the lens control unit 2a operate as a focus adjustment unit.

The image processing unit 13 performs predetermined image processing upon the signals from the image sensor 13 stored in the memory 7, and thereby generates image data. The image processing unit 13 functions as an image generation unit. After the image processing, the image compression unit 12 compresses the image data according to a predetermined format. And the recording unit 11 records the image data after compression upon a recording medium 11a according to a predetermined file format, and reads out image data recorded upon the recording medium 11a. The recording medium 11a is a memory card or the like that is freely detachable from the recording unit 11.

Moreover, the image processing unit 13 generates image data for displaying an image upon the display unit 14. Thus, the display unit 14 displays an image on the basis of image data generated by the image processing unit 13. An image (which may be a still image or a video image) replayed on the basis of image data recorded upon the recording medium 11a or a monitor image acquired by the image sensor 3 (i.e. a live view image) at predetermined intervals (for example at 60 fps) is included in the image that is displayed upon the display unit 14.

Outline of the Image sensor

Figure 2:
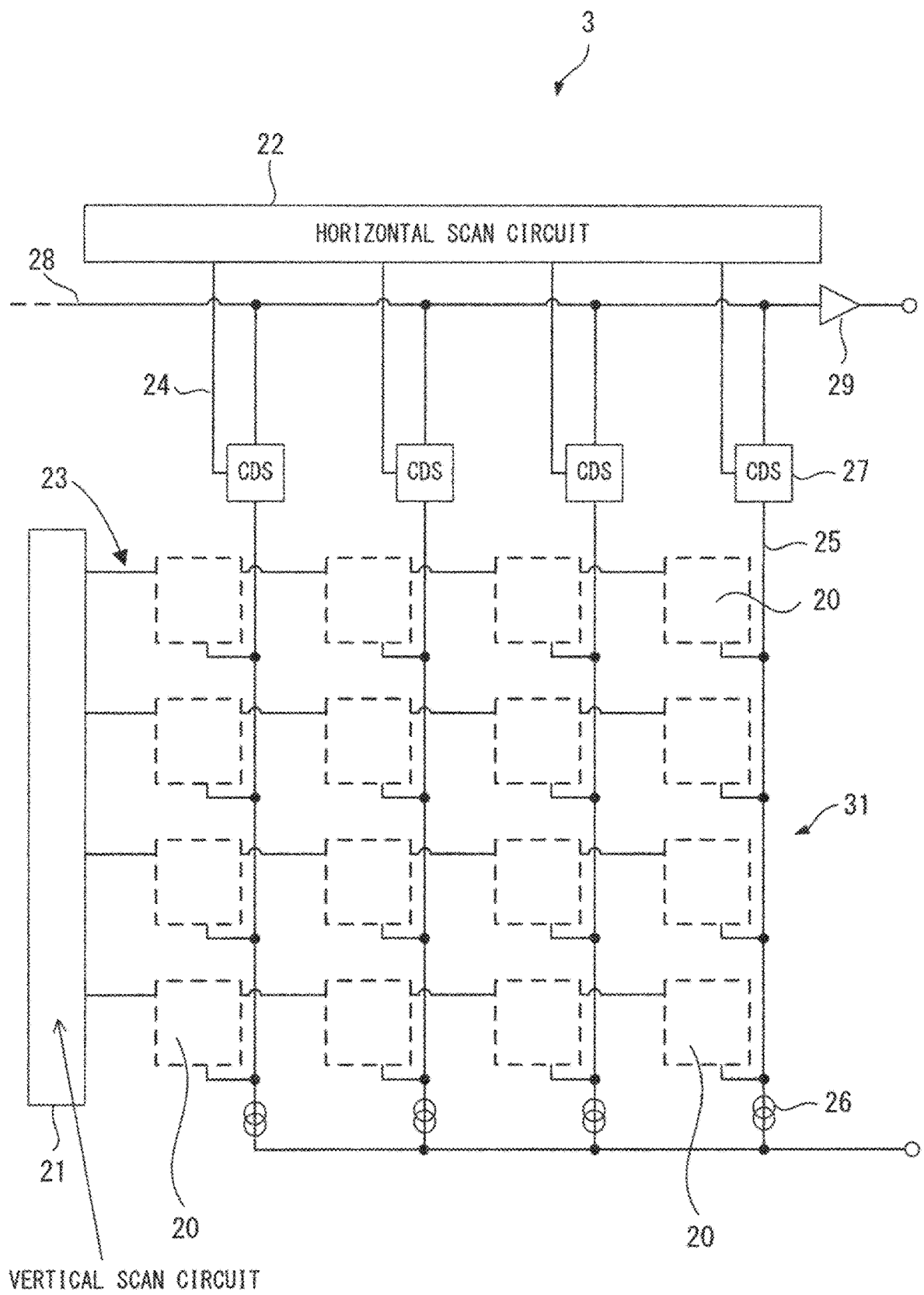
FIG. 2 is a figure showing an example of the general structure of an image sensor.

FIG. 2 is a figure showing an example of the general structure of the image sensor 3. The image sensor 3 includes a plurality of pixels 20 arranged in the form of a matrix, and peripheral circuitry for outputting signals from these pixels 20. Generally the minimum units that make up an image are termed "pixels", but, in this embodiment, the structures that generate signals of the minimum units making up the image are termed "pixels".

An image capture region 31 illustrates a region in which the pixels 20 are arranged in the form of a matrix. In the example of FIG. 2, a range of sixteen pixels, four rows horizontally by four columns vertically, is shown as an example of the image capture region 31, but the actual number of pixels is very much greater than shown in this FIG. 2 example.

Figure 3:
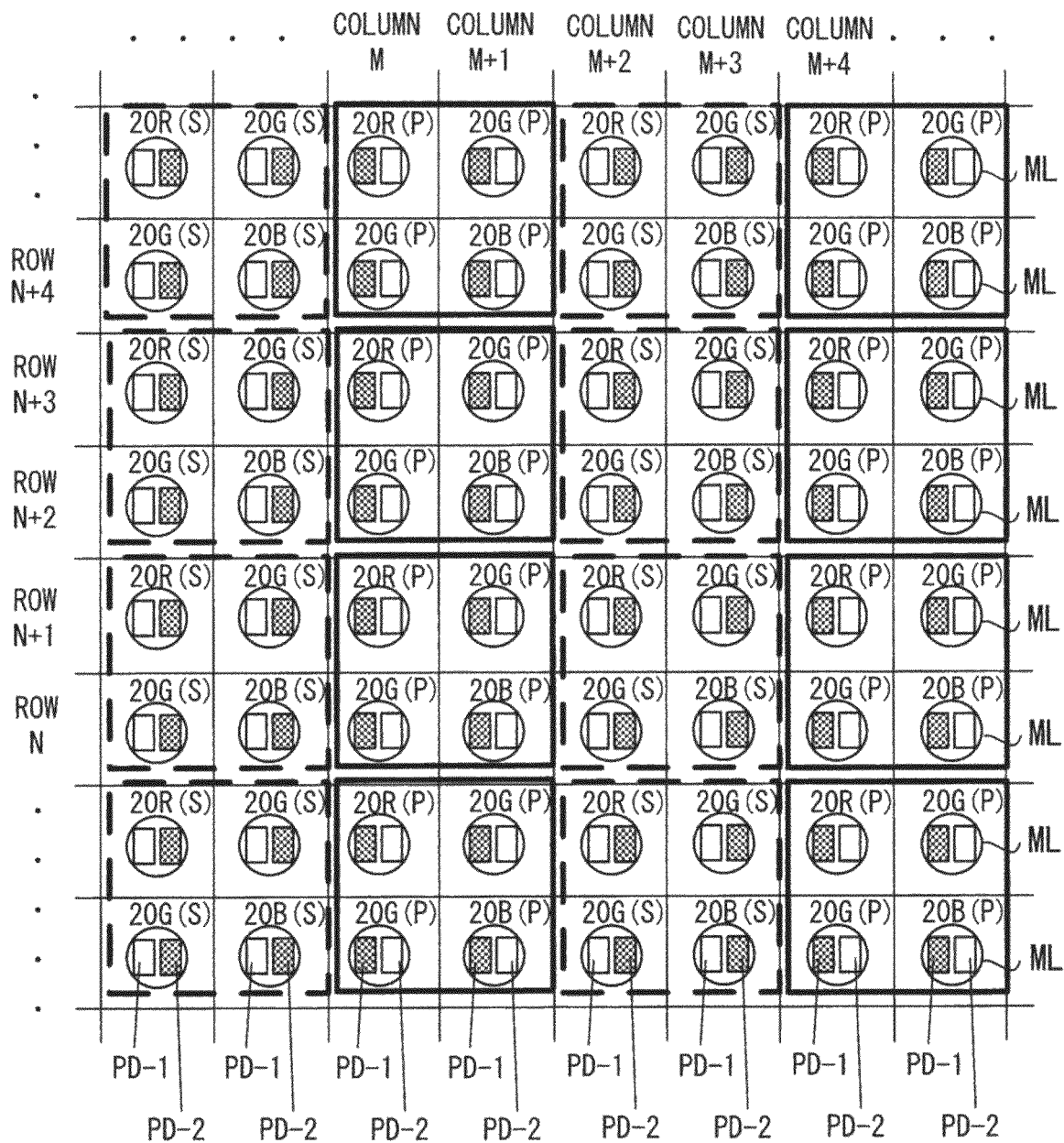
FIG. 3 is a figure showing an example of arrangement of pixels upon the image sensor.

FIG. 3 is a diagram for explanation of an example of arrangement of pixels upon the image sensor 3. Micro lenses ML and color filters not shown in the figures are provided to the pixels 20. A color filter of one of three types having different spectral characteristics, for example R (red), G (green), and B (blue), is provided to each of the pixels 20. The R color filters principally pass light of the red colored wavelength band.

And the G color filters principally pass light of the green colored wavelength band. Moreover, the B color filters principally pass light of the blue colored wavelength band.

Due to this, the various pixels 20 have different spectral characteristics, according to the color filters that are provided to them.

A pixel row in which pixels 20 having R and G color filters are disposed alternately (these will hereinafter be referred to as "pixels 20R" and "pixels 20G" respectively), and a pixel row in which pixels 20 having G and B color filters are disposed alternately (these will hereinafter be referred to as "pixels 20G" and "pixels 2B" respectively), are arranged repeatedly in a two dimensional arrangement upon the image sensor 3. In this first embodiment, these pixels 20R, 20G, and 20B are arranged according to a Bayer array.

It should be understood that, in the following explanation, when a reference is made to a "pixel 20" without affixing "R", "G", or "B" thereto, it will be supposed that a pixel of any of the types 20R, 20G, and 20B is meant.

Each of the pixels 20 is provided with two photoelectric conversion units. Generally, if two photoelectric conversion units are provided per each single pixel, there is a case in which the two photoelectric conversion units are arranged along the horizontal direction, in other along the row direction (sometimes this is also expressed as the pixel being "divided horizontally") and there is also a case in which the two photoelectric conversion units are arranged along the vertical direction, in other along the column direction (sometimes this is also expressed as the pixel being "divided vertically"). In this first embodiment, horizontally divided pixels 20 are arranged over the entire area of the image capture region 31. However, instead of horizontally divided pixels 2, it would also be acceptable to arrange to provide vertically divided pixels 20 in a predetermined region.

Each of the pixels 20 performs photoelectric conversion with its two photoelectric conversion units according to control signals from its peripheral circuitry, and outputs signals based upon charges generated by the photoelectric conversion.

The explanation will now refer again to FIG. 2. For example, the peripheral circuitry may comprise a vertical scan circuit 21, a horizontal scan circuit 22, control signal lines 23 and 24 that are connected thereto, vertical signal lines 25 that receive signals from the pixels 20, constant current sources 26 that are connected to the vertical signal lines 25, correlated double sampling (CDS) circuits 27, a horizontal signal line 28 that receives signals outputted from the CDS circuits 27, an output amp 29, and so on. In this embodiment, a single vertical signal line is provided for each single pixel column that consists of a plurality of pixels 20 arranged along the column direction.

According to commands from the imaging control unit 4 and via the control signal lines 23, the vertical scan circuit 21 and the horizontal scan circuit 22 output to the pixels 20 first control signals φTx1, second control signals φTx2, control signals σSEL, and control signals qRES, all of which will be described hereinafter. Each of the pixels 20 is driven by control signals outputted from the vertical scan circuit 21, and outputs signals to its vertical signal line 25 on the basis of charges generated by its photoelectric conversion units. Noise elimination is performed by the CDS circuits 27 upon these signals outputted from the pixels 20, and the results are outputted to the exterior via the horizontal signal line 28 and the output amp 29 according to control signals from the horizontal scan circuit 22.

A Structure Having Two Photodiodes in One Pixel

Figure 4:
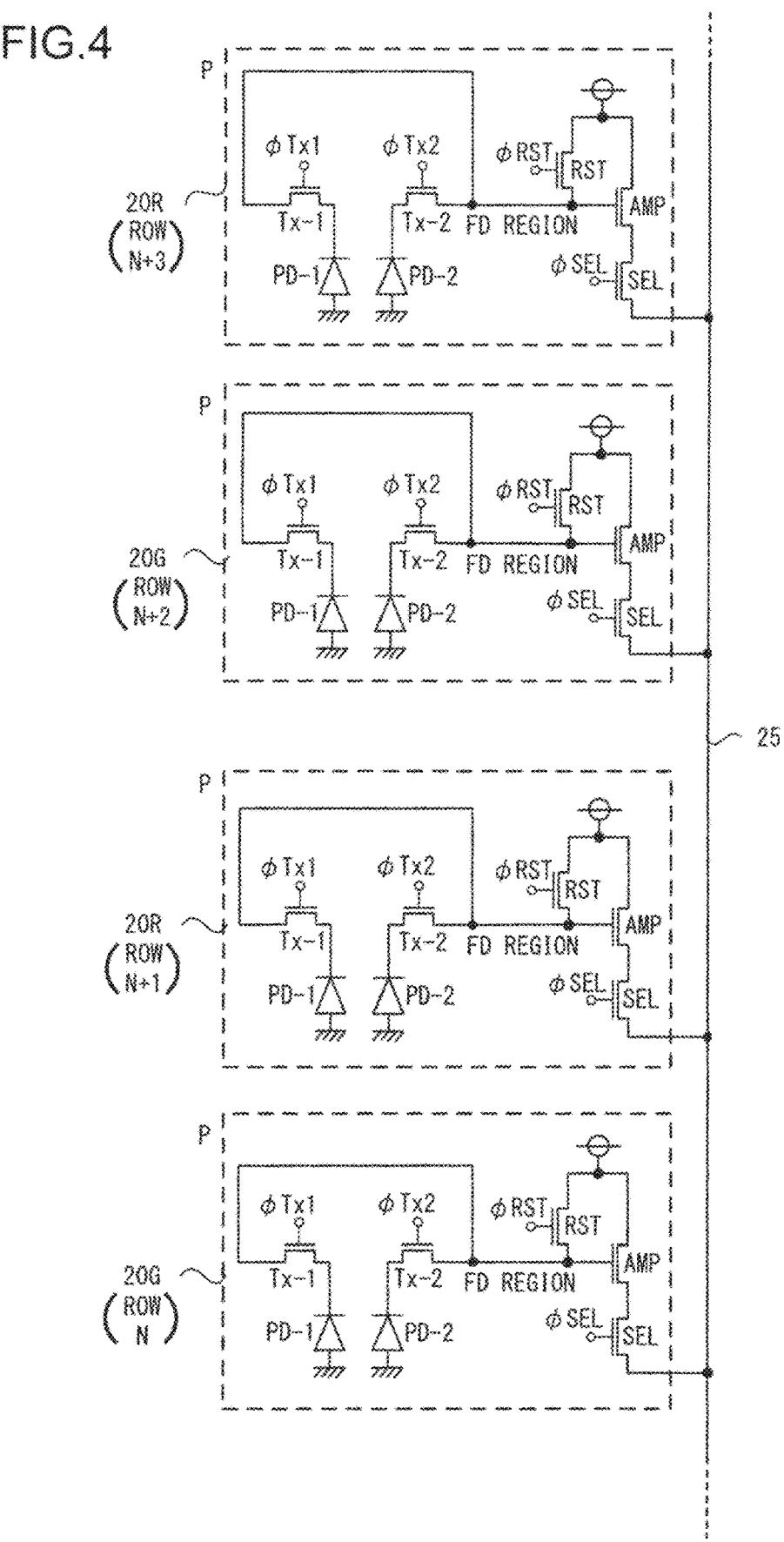
FIG. 4 is a circuit diagram for explanation of pixels arranged in a column M of FIG. 3.

FIG. 4 is a circuit diagram for explanation of pixels 20 arranged in a column M of FIG. 3 (i.e. arranged along the vertical direction), in other words, for example, for explanation of the pixel 20G of the N-th row, the pixel 20R of the (N+1)-th row, the pixel 20G of the (N+2)-th row, and the pixel 20R of the (N+3)-th row. Each of the pixels 20 incorporates two photodiodes PD-1 and PD-2 that serve as photoelectric conversion units, and that are inside of (i.e. behind) a micro lens and a color filter not shown in the figures. In more detail, each of the pixels 20 has a first photodiode PD-1 which is disposed on the left side of the pixel 20, and a second photodiode PD-2 which is disposed on the right side of the pixel 20.

Accordingly, ray bundles that have passed through a first region of the pupil of the photographic lens 2 are incident upon the first photodiodes PD-1 of the pixels 20, and ray bundles that have passed through a second region of the pupil of the photographic lens 2 are incident upon their second photodiodes PD-2.

In this embodiment, for example, a first photodiode PD-1 and a second photodiode PD-2 and a readout unit that reads out signals based upon the charges generated by these first and second photodiodes PD-1 and PD-2 are collectively termed a "pixel". While an example of such a readout unit that includes a transfer transistor, an FD region, an amplification transistor, and a selection transistor will be explained, the scope of the readout units is not necessarily limited to this example.

As described above, for each of the pixels 20, light that has passed through different regions of the pupil of the photographic lens 2, in other words light that has passed through first and second regions thereof, is incident upon the first and second photodiodes PD-1 and PD-2. Each of the first and second photodiodes PD-1 and PD-2 photoelectrically converts the light that is incident thereupon and generates charge. The charges generated by the first photodiode PD-1 and the second photodiode PD-2 are transferred to a common FD (floating diffusion) region via a first transfer transistor Tx-1 and a second transfer transistor Tx-2, respectively.

This common FD region accumulates charges that it receives, and converts that charges into a voltage. And a signal corresponding to the potential of the FD region is amplified by an amplification transistor AMP. The FD region and the amplification transistor AMP operate as a signal generation unit. And the signal that is generated is read out via a vertical signal line (output unit) 25 as a signal of a row that has been selected by a selection transistor SEL that selects a row. Moreover, a reset transistor RES operates as a resetting unit that resets the potential of the FD region.

In this first embodiment, for example, the charge generated by the first photodiode PD-1 (termed the "first charge") and the charge generated by the second photodiode PD-2 (termed the "second charge") are transferred to the single FD region in a time divided manner. In other words, the transfer of the charge generated by the first photodiode PD-1 and the transfer of the charge generated by the second photodiode PD-2 both employ the single FD region. Due to this, during the transfer of the first charge to the FD region, and during the transfer of the second charge, the ON/OFF states of the first transfer transistor Tx-1 and the second transfer transistor Tx-2 are changed over by control signals from the vertical scan circuit 21.

Furthermore, in the first embodiment, for example, a signal based upon the first charge generated by the first photodiode PD-1 (termed the "first signal") and a signal based upon the second charge generated by the second photodiode PD-2 (termed the "second signal" are sequentially read out in a time divided manner via the single vertical signal line 25. In other words, the common vertical signal line 25 is employed both for reading out the first signal and for reading out the second signal. Due to this, during the reading out of the first signal, and during the reading out of the second signal, the ON/OFF states of the first transfer transistor Tx-1 and the second transfer transistor Tx-2 are changed over by control signals from the vertical scan circuit 21.

The Pixel Types

In this first embodiment, pixels 20 termed "type P" and pixels 20 termed "type S" are provided. The pixel 20G of the N-th row, the pixel 20R of the (N+1)-th row, the pixel 20G of the (N+2)-th row, and the pixel 20R of the (N+3)-th row shown in the FIG. 4 example correspond to type P.

In a pixel 20 of type P, the first transfer transistor Tx-1 that transfers the first charge generated by the first photodiode PD-1 to the FD region is turned ON by the first control signal φTx1. Moreover, the second transfer transistor Tx-2 that transfers the second charge generated by the second photodiode PD-2 to the FD region is turned ON by the second control signal φTx2.

The selection transistor SEL for row selection that causes the first signal or the second signal to be outputted to the vertical signal line (output unit) 25 is turned ON by the control signal qSEL. And the reset transistor RES that causes the potential of the FD region to be reset is turned ON by the control signal QRES.

Figure 5:
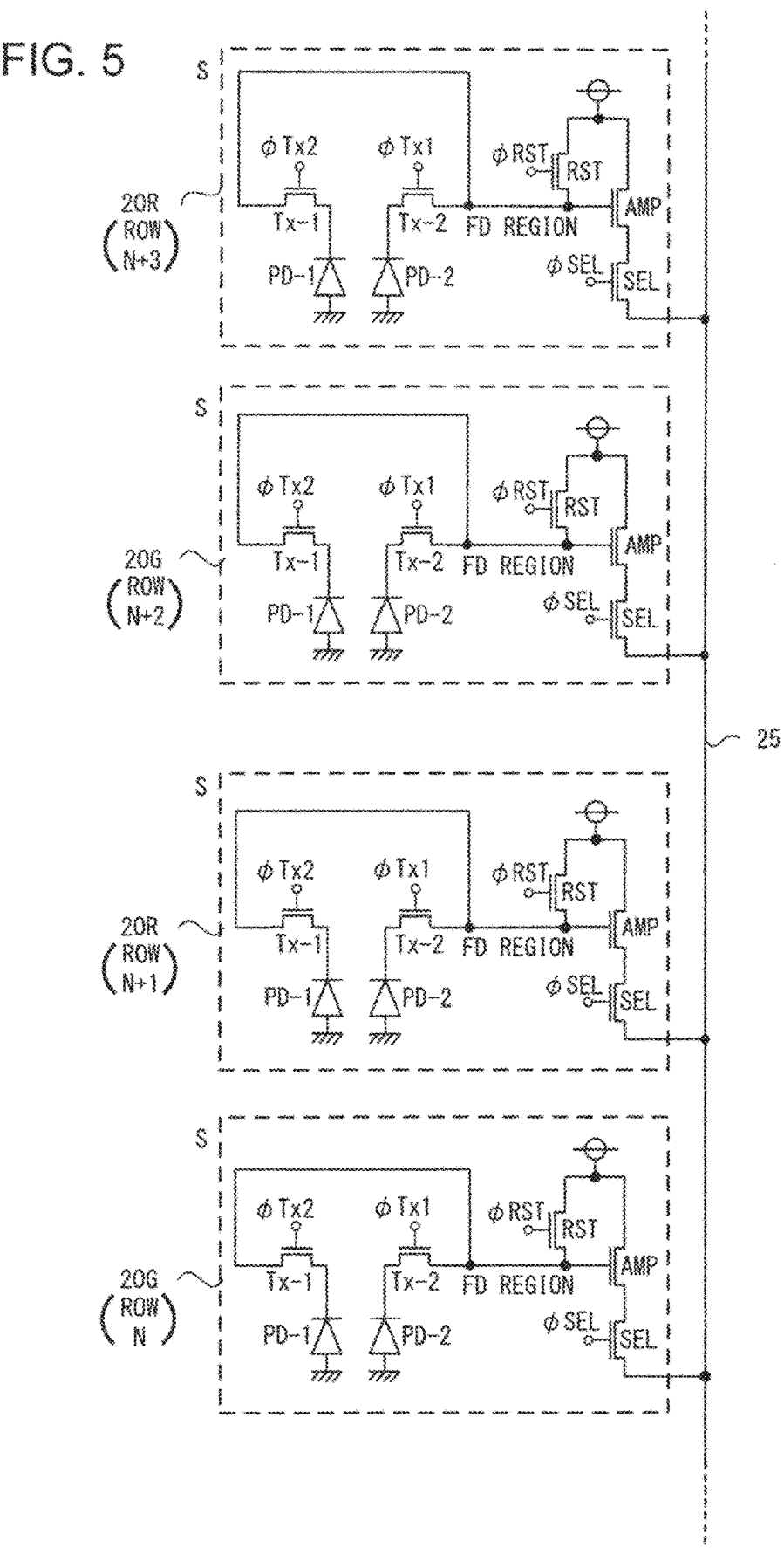
FIG. 5 is a circuit diagram for explanation of pixels arranged in a column M+1 of FIG. 3.

FIG. 5 is a circuit diagram for explanation of the pixels 20 arranged in the (M+2)-th column of FIG. 3 (in other words along the vertical direction), for example for explanation of the pixel 20G of the N-th row, the pixel 20R of the (N+1)-th row, the pixel 20G of the (N+2)-th row, and the pixel 20R of the (N+3)-th row. Each of the pixels 20 comprises first and second photodiodes PD-1 and PD-2 that serve as photoelectric conversion units, and that are inside (i.e. behind) a micro lens and a color filter not shown in the figures. As described above, some of the pixels 20 are divided horizontally and some are divided vertically.

Furthermore, the feature that ray bundles that have passed through a first region of the pupil of the photographic lens 2 are incident upon the first photodiodes PD-1 of each pixel 20, and that ray bundles that have passed through a second region of the pupil of the photographic lens 2 are incident upon the second photodiodes PD-2 of each pixel 20, is the same as in the FIG. 4 case.

The pixel 20G of the N-th row, the pixel 20R of the (N+1)-th row, the pixel 20G of the (N+2)-th row, and the pixel 20R of the (N+3)-th row shown in the FIG. 5 example correspond to type S. The feature of difference between type S and type P is that the relationships between the first and second transfer transistors Tx-1 and Tx-2 and the first and second control signals φTx1 and φTx2 that are supplied thereto are opposite. In other words, in the type S the second control signal φTx2 is supplied to the first transfer transistor Tx-1, and the first control signal φTx1 is supplied to the second transfer transistor Tx-2.

Due to this, in a pixel 20 of type S, the first transfer transistor Tx-1 that transfers the first charge generated by the first photodiode PD-1 to the FD region is turned ON by the second control signal φTx2. Moreover, the second transfer transistor Tx-2 that transfers the second charge generated by the second photodiode PD-2 to the FD region is turned ON by the first control signal φTx1.

The selection transistor SEL for row selection that causes the first signal or the second signal to be outputted to the vertical signal line (output unit) 25 is turned ON by the control signal qSEL. And the reset transistor RES that causes the potential of the FD region to be reset is turned ON by the control signal RES.

The Arrangement of the Type P and Type S Pixels

The arrangement of the type P pixels and the type S pixels will now be explained. Concentrating attention upon the 2×2 pixels in the units of FIG. 3 that are repeated as a Bayer array, it will be understood that these repeated units may be divided into a group of repeated units in each of which all four pixels are of type P, i.e. are pixels 20G (P), 20B (P), 20R (P), and 20G (P), and a group of repeated units in each of which all four pixels are of type S, i.e. are pixels 20G(S), 20B(S), 20R(S), and 20G(S). Among these, the repeated units in the group each of which consists of four pixels all of type P, i.e. pixels 20G (P), 20B (P), 20R (P), and 20G (P), are surrounded by thick solid lines in the figure, whereas the repeated units in the group each of which consists of four pixels all of type S, i.e. pixels 20G(S), 20B(S), 20R(S), and 20G(S), are surrounded by thick dashed lines.

According to FIG. 3, the groups surrounded by the thick solid lines and the groups surrounded by the thick broken lines are arranged alternately in the row direction (i.e. in the horizontal direction).

Furthermore, the groups surrounded by the thick solid lines and the groups surrounded by the thick broken lines are arranged continuously in the column direction (i.e. in the vertical direction).

In each pixel 20 of FIG. 3, one of the first and second photodiodes PD-1 and PD-2 is picked out by cross hatching. Cross hatching on a photodiode indicates a photodiode for which the charge generated by the photodiode is transferred to the FD region when the first control signal φTx1 is supplied to that hatched photodiode. On the other hand, the fact that a photodiode is not shown as cross hatched indicates a photodiode for which the charge generated by the photodiode is transferred to the FD region when the second control signal φTx2 is supplied to that non-hatched photodiode. Accordingly, with a pixel 20G (P) of type P, the first photodiode PD-1 is shown as cross hatched but the second photodiode PD-2 is not shown as cross hatched, whereas conversely, with a pixel 20G(S) of type S, the second photodiode PD-2 is shown as cross hatched but the first photodiode PD-1 is not shown as cross hatched.

Accordingly, for example, with a pixel 20G (P) of type P, when the first control signal φTx1 is supplied to the first transfer transistor Tx-1, the first charge generated by the first photodiode PD-1 is transferred to the FD region. This means that the first signal is generated on the basis of the first charge that has been transferred to the FD region. And, with a pixel 20G (P) of type P, when the second control signal φTx2 is supplied to the second transfer transistor Tx-2, the second charge generated by the second photodiode PD-2 is transferred to the FD region. This means that the second signal is generated on the basis of the second charge that has been transferred to the FD region. The same holds for pixels 20B (P) and 20R (P) of type P.

On the other hand, with a pixel 20G(S) of type S, when the first control signal φTx1 is supplied to the second transfer transistor Tx-2, the second charge generated by the second photodiode PD-2 is transferred to the FD region. This means that the second signal is generated on the basis of the second charge that has been transferred to the FD region. And, with a pixel 20G(S) of type S, when the second control signal φTx2 is supplied to the first transfer transistor Tx-1, the first charge generated by the first photodiode PD-1 is transferred to the FD region. This means that the first signal is generated on the basis of the first charge that has been transferred to the FD region. The same holds for pixels 20B(S) and 20R(S) of type S.

As described above, light that has passed through different regions of the photographic lens 2 is incident upon the first and second photodiodes PD-1 and PD-2 of the pixels 20. Moreover, as described above, the pixels 20 are divided into the groups that are surrounded by the thick solid lines and the groups that are surrounded by the thick broken lines, and pixel groups of these types are arranged alternately along the row direction (i.e. along the horizontal direction), while pixel groups of the same type are arranged along the column direction (i.e. along the vertical direction). Due to this, when the vertical scan circuit 21 outputs the first control signal φTx1 and the second control signal φTx2, concentrating attention upon pixels 20 of the same color that are arranged along the horizontal direction in the same pixel row, for any of the pixel rows, a first signal and a second signal are simultaneously read out that are based upon light that has passed through different regions of the pupil of the photographic lens 2. For example, attention will be concentrated upon the pixels 20G that are arranged along the horizontal direction in the N-th row. When the vertical scan circuit 21 outputs the first control signal φTx1, in the pixel 20G (P) in the M-th column, the first charge is transferred to the FD region and the first signal is generated. And, in the pixel 20G(S) in the (M+2)-th column, the second charge is transferred to the FD region and the second signal is generated. The first signal generated by the pixel 20G (P) of the N-th row and the M-th column, and the second signal generated by the pixel 20G(S) of the N-th row and the (M+2)-th column are outputted to the respective vertical signal lines 25. And, when the vertical scan circuit 21 outputs the second control signal φTx2, in the pixel 20G (P) in the M-th column, the second charge is transferred to the FD region and the second signal is generated. And, in the pixel 20G(S) in the (M+2)-th column, the first charge is transferred to the FD region and the first signal is generated. The second signal generated by the pixel 20G (P) of the N-th row and the M-th column, and the first signal generated by the pixel 20G(S) of the N-th row and the (M+2)-th column are outputted to the respective vertical signal lines 25. The same is also the case for the pixels 20G arranged along the horizontal direction in the (N+1)-th through the (N+4)-th row, the pixels 20B arranged along the horizontal direction in the N-th row, the (N+2)-th row, and the (N+4)-th row, and the pixels 20R arranged along the horizontal direction in the (N+1)-th row and the (N+3)-th row.

It should be understood that, when attention is concentrated upon pixels 20 of the same color that are arranged along the vertical direction in the same pixel column, the image sensor 3 may be divided into columns for which the first signals described above are read out (the M-th column, the (M+1)-th column, and the (M+4)-th column in FIG. 3), and columns for which the second signals described above are read out (the (M+2)-th column and the (M+3)-th column in FIG. 3).

Focus Adjustment

The camera 1 according to this embodiment generates a pair of focus detection signals that are employed for focus detection (i.e. for detection of a focusing position), for example on the basis of first signals and second signals of pixels 20G read out from pixel rows that are included in a focusing area. The focusing area is an area over which the focus calculation unit 10 detects an amount of image deviation as phase difference information, and may also be termed the "focus detection area", the "range-finding point", or the "auto focus (AF) point".

When, for example, an actuation signal that indicates that half press actuation of the release button has been performed is inputted from the actuation unit 9a, the microprocessor 9 issues a command to the imaging control unit 4 for performing image capture for focus adjustment. And, in this image capture for focus adjustment, control signals for performing first reading out are supplied from the vertical scan circuit 21 and from the horizontal scan circuit 22 to the pixel row of the image sensor 3 that is to be the subject of reading out, so that the first reading out is performed. This first reading out consists of supplying the first control signals Tx1 and so on to the pixels 20G of the pixel row and reading out the first signals based upon the first charges generated by the first photodiodes PD-1 from the pixels 20G of type P, and also reading out the second signals based upon the second charges generated by the second photodiodes PD-2 from the pixels 20G of type S.

Due to the first reading out, the first signal and the second signal that have been read out from the pixels 20G of the pixel row to which the first control signals φTx1 have been supplied are stored in the memory 7. The plurality of first signals A1, A2, . . . . An (termed the "group "a" signals") stored in the memory 7 and the plurality of second signals B1, B2, . . . . Bn (termed the "group "b" signals") stored in the memory 7 represent the intensity distributions of images due to a plurality of ray bundles that have passed through the different regions of the pupil of the photographic lens 2.

Since group "a" signals and group "b" signals can be obtained by performing reading out only once for each pixel row, accordingly it is possible to carry out the image deviation detection calculation processing more quickly, as compared to the case in which it is necessary to perform reading out twice for each pixel row in order to obtain group "a" signals and group "b" signals from that pixel row.

Figure 6:
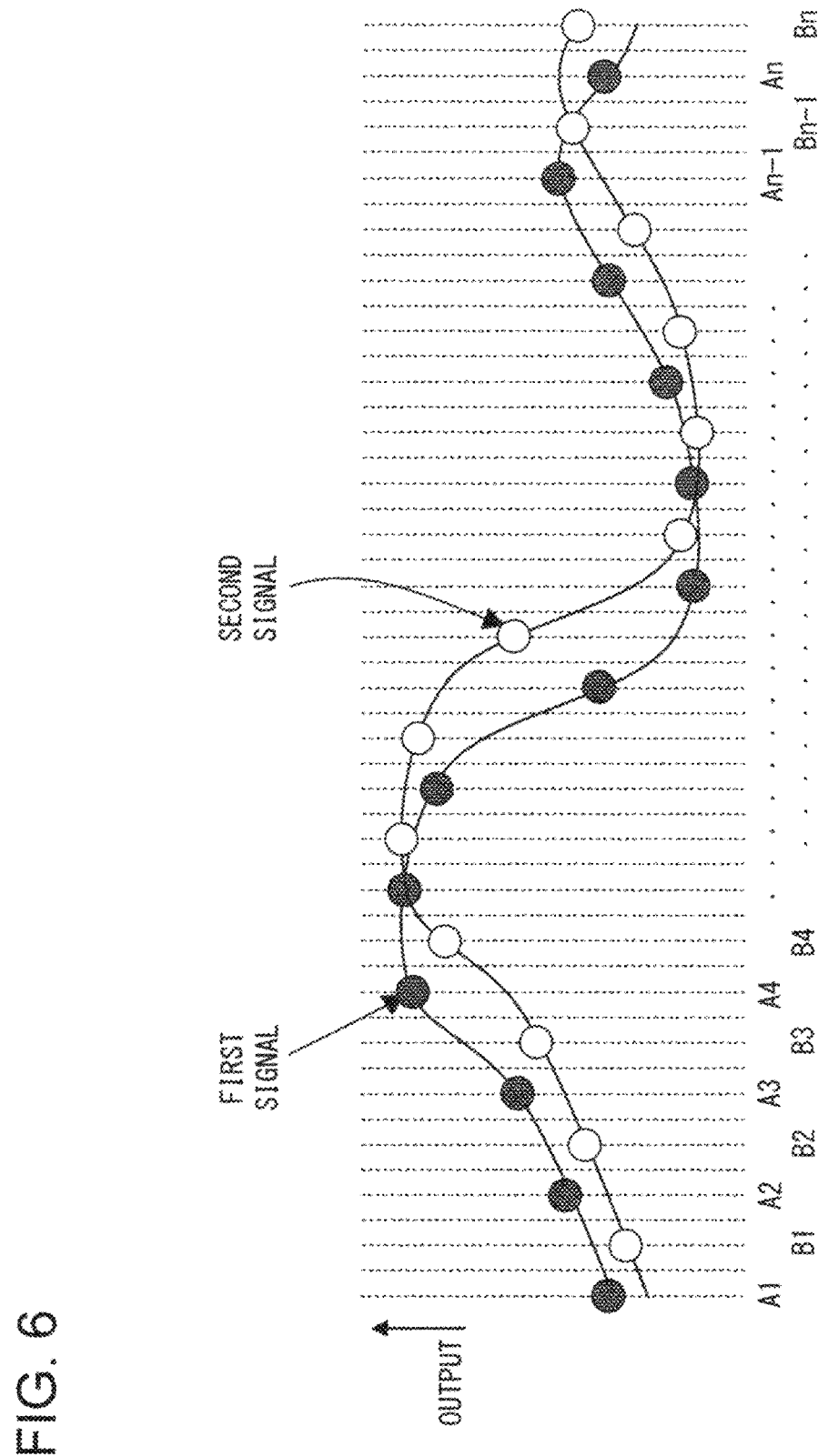
FIG. 6 is a figure showing an example of group "a" signals and an example of group "b" signals.

FIG. 6 is a figure showing an example of group "a" signals consisting of a plurality of the first signals and an example of group "b" signals consisting of a plurality of the second signals. In FIG. 6, the n group "a" signals are represented by cross hatched circles. Moreover, the n group "b" signals are represented by white circles. The group "a" signals and the group "b" signals from the pixels 20G are read out for each fourth column of FIG. 3, respectively, and the positions of the group "a" signals and the positions of the group "b" signals are deviated by two columns. The vertical dotted lines in FIG. 6 correspond to the pixel columns.

On the basis of the group "a" signals and the group "b" signals described above, the focus calculation unit 10 calculates the amount of image deviation of the plurality of images by performing image deviation detection calculation processing (i.e. correlation calculation processing and phase difference detection processing), and calculates a defocusing amount by multiplying the amount of image deviation by a predetermined conversion coefficient.

Next, the microprocessor 9 makes a decision as to whether or not the defocusing amount that has thus been calculated by the focus calculation unit 10 is within a permitted value. If the defocusing amount exceeds the permitted value, then the microprocessor 9 decides that the current focused state is not correct, and sends a lens drive command to the lens control unit 2a. And the lens control unit 2a shifts the focusing lens to a position (the focused position) that brings the defocusing amount within the permitted value. On the other hand, if the defocusing amount is within the permitted value, then the microprocessor decides that the focused state is correct, and does not send any lens shifting command.

While, in the above explanation, an example was explained in which the imaging control unit 4 caused the image sensor 3 to perform a first reading out for the image capture for focus adjustment, it would also be acceptable for the control unit to cause a second reading out to be performed, instead of the first reading out. Such a second reading out consists of supplying the second control signals φTx2 and so on to the pixels 20G of the pixel row and reading out the second signals based upon the second charges generated by the second photodiodes PD-2 from the pixels 20G of type P, and also reading out the first signals based upon the first charges generated by the first photodiodes PD-1 from the pixels 20G of type S. By performing image deviation detection calculation processing (correlation calculation processing and phase difference detection processing) on the basis of the group "a" signals stored in the memory 7 and the group "b" signals stored in the memory 7 by the second reading out, the focus calculation unit 10 calculates the image deviation of the plurality of images, and then calculates the defocusing amount by multiplying this amount of image deviation by a predetermined conversion coefficient.

Moreover, if focus adjustment is performed while a monitor image is being displayed upon the display unit 14, then the imaging control unit 4 is able alternately to cause the image sensor 3 to perform the first reading out for focus adjustment, and to perform the second reading out for imaging. In this case, the first reading out for focus adjustment and the second reading out for imaging are read out by subsampling the pixels 20 of the image capture region 31 (refer to FIG. 2). And, for example, after the first reading out, the microprocessor 9 starts image deviation detection calculation processing on the basis of the group "a" signals and the group "b" signals that have been stored in the memory 7 by the first reading out.

Next, in parallel with the image deviation detection calculation processing described above, the microprocessor 9 commands the imaging control unit 4 to perform the second reading out. By, for example, the imaging control unit 4 performing the second reading out without resetting the potentials of the FD regions after the first reading out, the charges due to the second reading out are added in the FD regions to the charges due to the first reading out. Due to this, in the second reading out, the sums of the first signals and the second signals from the pixels 20 are read out as the image signals. The image processing unit generates image data for displaying a monitor image upon the display unit 14 by performing predetermined image processing upon these sums of the first signals and the second signals (i.e. upon the image signals).

And the imaging control unit 4 resets the potential of the FD region after the second reading out, and repeatedly performs the first reading out and the second reading out described above again. Due to this, the camera 1 is able to display a monitor image while performing focus adjustment.

It should be understood that, with the camera 1 described above, image data that is employed for focus adjustment is generated on the basis of the first signals and the second signals that have been read out from the pixel rows included in the focusing area. The image data employed for focus adjustment is not limited to being first signals and second signals from pixels 20G; it would also be acceptable for it to be generated on the basis of first signals and second signals from pixels 20R, or for it to be generated on the basis of first signals and second signals from pixels 20B.

Generation of the Image Data

The camera 1 of this embodiment generates image data related to an image of the photographic subject on the basis of the first signals and the second signals that are read out from the pixels 20 of the image capture region 31 (refer to FIG. 2). For example, when an actuation signal is inputted from the actuation unit 9a indicating that full press actuation of the release button has been performed, then the microprocessor 9 commands the imaging control unit 4 to capture an image for recording. In this capture of an image for recording, control signals are supplied from the vertical scan circuit 21 and from the horizontal scan circuit 22 to each pixel row of the image sensor 3, and thereby the first reading out and the second reading out are performed without pixel subsampling.

The imaging control unit 4 supplies the first control signals φTx1 and so on to the pixels of the pixel row for the first reading out. Due to these first control signals φTx1 being supplied, the first charges that have been generated by the first photodiodes PD-1 of the pixels 20 of type P are accumulated in their FD regions, and in a similar manner the second charges that have been generated by the second photodiodes PD-2 of the pixels 20 of type S are accumulated in their FD regions. And next the imaging control unit 4 performs the second reading out by supplying the second control signals φTx2 and so on to the pixels of the pixel rows, without resetting the potentials of the FD regions after the first reading out. Due to this supply of the second control signals φTx2, the second charges that have been generated by the second photodiodes PD-2 of the pixels of type P are additionally accumulated in the FD regions, in other words are accumulated while being added. In a similar manner, the first charges that have been generated by the first photodiodes PD-1 of the pixels of type S are additionally accumulated in the FD regions, in other words are accumulated while being added. It is not necessary for the first reading out and the second reading out to be performed at different timings; the first reading out and the second reading out may be performed simultaneously. In other words, it will be acceptable to arrange for the vertical scan circuit 21 to supply the first control signals φTx1 and the second control signals φTx2 respectively to the first transfer transistors Tx-1 and the second transfer transistors Tx-2 simultaneously.

In this manner, a signal for imaging obtained by adding together the first signal and the second signal is read out from each of the pixels 20, and the image processing unit 13 generates image data related to the photographic subject image by performing tone processing, color interpolation processing, and so on upon this signal for imaging.

Instead of employing the processing described above, generation of the image data can also be performed as described below. That is, in the first reading out, the imaging control unit 4 reads out the first signals from the pixels 20 of type P by supplying the first control signals φTx1 and so on to the pixels of the pixel row, and also reads out the second signals from the pixels 20 of type S. Moreover, after the first reading out, and after having reset the potentials of the FD regions, the imaging control unit 4 performs the second reading out, in which it reads out the second signals from the pixels 20 of type P by supplying the second control signals φTx2 and so on to the pixels of the pixel row, and also reads out the first signals from the pixels 20 of type S.

Due to this, the first signals and the second signals that have been read out from the pixels 20 by the first reading out and the first signals and the second signals that have been read out from the pixels 20 by the second reading out are stored in the memory 7. The image processing unit 13 generates signals for imaging by, for each pixel 20, adding together the first signals and the second signals that have been stored in the memory 7, and then generates image data related to the photographic subject image by further performing tone processing, color interpolation processing, and so on thereupon.

According to the first embodiment as explained above, the following operations and beneficial effects are obtained.

(1) The image sensor 3 comprises: the pixel 20G (P) and the pixel 20G(S), each of which comprises the first photodiode PD-1 that photoelectrically converts light that has passed through the micro lens ML and generates the first charge, the second photodiode PD-2 that photoelectrically converts light that has passed through the micro lens ML and generates the second charge, the FD region that accumulates at least one of the above described first charge and the above described second charge, the first transfer transistor Tx-1 that transfers the first charge to the FD region, and the second transfer transistor Tx-2 that transfers the second charge to the FD region; and the vertical scan circuit 21 that outputs the first control signal φTx1 that causes the first charge of the pixel 20G (P) and the second charge of the pixel 20G(S) to be transferred to the FD regions, to the first transfer transistor of the pixel 20G (P) and to the second transfer transistor Tx-2 of the pixel 20G(S). Since, due to this, the group "a" signals and the group "b" signals are obtained by only performing reading out once by supplying the first control signal φTx1 to the pixel row, accordingly it is possible to perform image deviation detection calculation processing more quickly, as compared to a case in which, in order to obtain the group "a" signals and the group "b" signals from the pixel row, reading out by supplying the first control signal φTx1 to the pixel row, and then reading out by supplying the second control signal φTx2 thereto, are performed twice. Due to this, it is possible to perform focus adjustment quickly.

(2) In the image sensor 3, since the vertical scan circuit 21 outputs, to the first transfer transistor Tx-1 of the pixel 20G (P) and to the second transfer transistor Tx-2 of the pixel 20G(S), the first control signal φTx1 that causes the first charge of the pixel 20G (P) to be transferred to its FD region and also causes the second charge of the pixel 20G(S) to be transferred to its FD region, accordingly, for each pixel row, the group "a" signals and the group "b" signals can be obtained by performing reading out only once by supplying the first control signal φTx1.

(3) In the image sensor 3, since the vertical scan circuit 21 outputs the first control signal φTx1 to the first transfer transistor Tx-1 of the pixel 20G (P) and to the second transfer transistor 20G(S) of the pixel 20G(S) via the control signal line 23 that connects the vertical scan circuit 21 to the first transfer transistor Tx-1 of the pixel 20G (P) and to the second transfer transistor Tx-2 of the pixel 20G(S), accordingly, for each pixel row, the group "a" signals and the group "b" signals can be obtained by performing reading out only once by supplying the first control signal φTx1.

(4) In the image sensor 3, since the vertical scan circuit 21 outputs the second control signal φTx2 that causes the second charge of the pixel 20G (P) and the first charge of the pixel 20G(S) to be transferred to their FD regions, to the second transfer transistor Tx-2 of the pixel 20G (P) and to the first transfer transistor Tx-1 of the pixel 20G(S), accordingly, for each pixel row, the group "a" signals and the group "b" signals can be obtained by performing reading out only once by supplying the second control signal φTx2.

(5) In the image sensor 3, since the vertical scan circuit 21 outputs, to the second transfer transistor Tx-2 of the pixel 20G (P) and to the first transfer transistor Tx-1 of the pixel 20G(S), the second control signal φTx2 that causes the second charge of the pixel 20G (P) to be transferred to its FD region and also causes the first charge of the pixel 20G(S) to be transferred to its FD region, accordingly, for each pixel row, the group "a" signals and the group "b" signals can be obtained by performing reading out only once by supplying the second control signal φTx2.

(6) In the image sensor 3, since the vertical scan circuit 21 outputs the second control signal φTx2 to the second transfer transistor Tx-2 of the pixel 20G (P) and to the first transfer transistor Tx-1 of the pixel 20G(S) via the control signal line 23 that connects the vertical scan circuit 21 to the first transfer transistor Tx-1 of the pixel 20G (P) and to the second transfer transistor Tx-2 of the pixel 20G(S), accordingly, for each pixel row, the group "a" signals and the group "b" signals can be obtained by performing reading out only once by supplying the second control signal φTx2.

(7) In the image sensor 3, the pixel 20G (P) and the pixel 20G(S) are arranged, for example, along the row direction (i.e. along the horizontal direction), and the first photodiodes PD-1 and the second photodiodes PD2 are arranged in sequence along the row direction (i.e. along the horizontal direction).

(8) The camera 1, which is an example of an imaging device, comprises: an image sensor 3 as described above that captures an image formed by the photographic lens 2 that comprises a focusing lens; and the focus calculation unit 10, the microprocessor 9 and the lens control unit 2a that control the position of the focusing lens on the basis of the first signal based upon the first charge of the pixel 20G (P) and the second signal based upon the second charge of the pixel 20G(S) of the image sensor 3, so that an image formed by the photographic lens 2 is focused upon the image sensor 3. Due to this, it is possible to perform focus adjustment quickly.

The Second Embodiment

In the second embodiment of the present invention, the arrangement of the pixels of type P and of type S is different, as compared to the first embodiment. The structures of the pixels 20 referred to as being of type P and referred to as being of type S are the same as in the first embodiment.

It should be understood that the camera 1 according to this second embodiment may also either be, or may not be, an exchangeable lens type camera, in a similar manner to the case with the first embodiment. Furthermore, it may also be built as an imaging device such as a smart phone or a video camera or the like.

Figure 7:
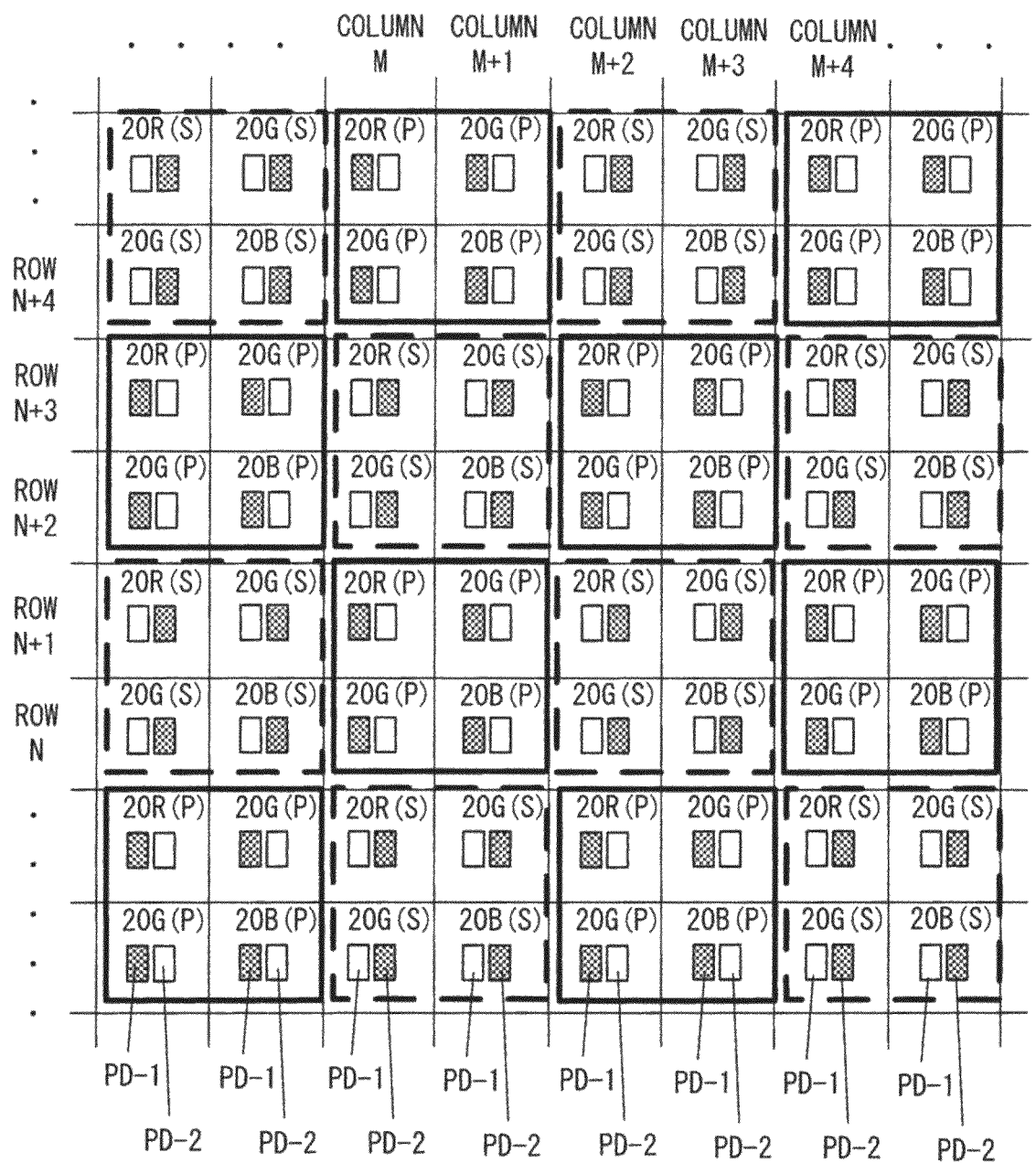
FIG. 7 is a figure showing an example of a pixel arrangement in a second embodiment.

FIG. 7 is a figure showing an example of arrangement of pixels upon the image sensor 3 of the second embodiment. In FIG. 7, concentrating attention upon the 2×2 pixels that are the Bayer array repeating unit, the feature that the pixels can be divided into groups of repeating units each consisting of pixels 20G (P), 20B (P), 20R (P), and 20G (P) all of type P (each surrounded by a thick solid line), and groups of repeating units each consisting of pixels 20G(S), 20B(S), 20R(S), and 20G(S) all of type S (each surrounded by a thick broken line), is the same as in the case of the first embodiment.

It should be understood that, in FIG. 7, the micro lenses ML are omitted.

Furthermore, the feature that the groups that are surrounded by the thick solid lines and the groups that are surrounded by the thick broken lines are arranged alternately in sequence along the row direction (i.e. along the horizontal direction) is common with the first embodiment.

However, the feature that that the groups that are surrounded by the thick solid lines and the groups that are surrounded by the thick broken lines are arranged alternately in sequence along the column direction (i.e. along the vertical direction) is different from the first embodiment.

Accordingly, in this second embodiment, the groups that are surrounded by the thick solid lines and the groups that are surrounded by the thick broken lines are arranged to form a so-called checkerboard pattern.

Figure 8:
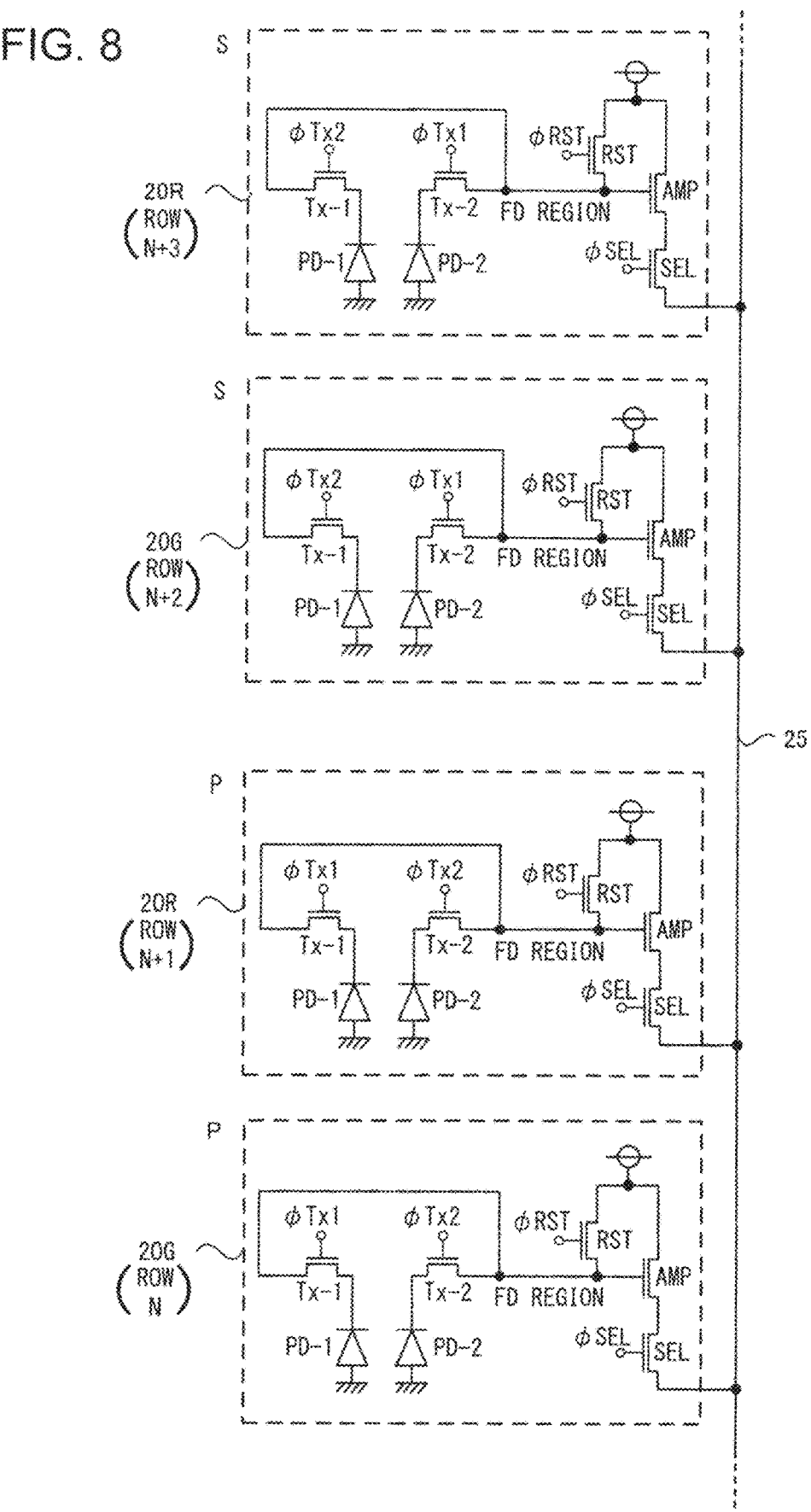
FIG. 8 is a circuit diagram for explanation of pixels arranged in a column M of FIG. 7.

FIG. 8 is a circuit diagram for explanation of pixels 20 arranged in a column M of FIG. 7 (i.e. arranged in sequence in the vertical direction), in other words, as an example, for explanation of a pixel 20G (P) of the N-th row, a pixel 20R (P) of the (N+1)-th row, a pixel 20G(S) of the (N+2)-th row, and a pixel 20R(S) of the (N+3)-th row. While the feature that each of the pixels 20 includes, behind a micro lens and a color filter not shown in the figures, a first photodiode PD-1 and a second photodiode PD-2 which serve as photoelectric conversion units, is the same as in the case of the first embodiment, the feature that the pixels 20 arranged in sequence in the vertical direction in FIG. 7 are of different types alternately (the type P and the type S being alternately repeated) is different from the case of the first embodiment.

In each pixel of FIG. 7, one of the first and second photodiodes PD-1 and PD-2 is picked out by cross hatching. Cross hatching on a photodiode indicates a photodiode for which charge generated by that photodiode is transferred to an FD region upon supply of a first control signal φTx1. And the absence of cross hatching on a photodiode indicates a photodiode for which charge generated by that photodiode is transferred to the FD region upon supply of a second control signal φTx2. For example, with a pixel 20G (P) of type P, when the first control signal φTx1 is supplied to a first transfer transistor Tx-1, a first charge generated by the first photodiode PD-1 is transferred to the FD region. And this means that a first signal is read out on the basis of this first charge that has been transferred to the FD region. Moreover, with such a pixel 20G (P) of type P, when the second control signal Tx2 is supplied to a second transfer transistor Tx-2, a second charge generated by the second photodiode PD-2 is transferred to the FD region. And this means that a second signal is generated on the basis of this second charge that has been transferred to the FD region. The same is the case for the pixels 20B (P) and 20R (P) of type P.

On the other hand, with a pixel 20G(S) of type S, when the first control signal φTx1 is supplied to a second transfer transistor Tx-2, a second charge generated by the second photodiode PD-2 of the pixel 20G(S) is transferred to the FD region. And this means that a second signal is read out on the basis of this second charge that has been transferred to the FD region. Moreover, with such a pixel 20G(S) of type S, when the second control signal φTx2 is supplied to a first transfer transistor Tx-1, a first charge generated by the first photodiode PD-1 is transferred to the FD region. And this means that a first signal is generated on the basis of this first charge that has been transferred to the FD region. The same is the case for the pixels 20B(S) and 20R(S) of type S.

As described above, light that has passed through different regions of the pupil of the photographic lens 2, in other words that has passed through first and second regions thereof, is incident upon the first and second photodiodes PD-1 and PD-2 of the pixel 20. Moreover, as described above, the pixels 20 may be divided into the groups that are surrounded by thick solid lines and the groups that are surrounded by thick broken lines, and these groups are arranged alternately along the row direction (i.e. along the horizontal direction), and also alternately along the column direction (i.e. along the vertical direction). Due to this, when attention is concentrated upon pixels 20 of the same color that are arranged in sequence in the same pixel row along the horizontal direction, in a similar manner to the case with the first embodiment, a first signal and a second signal that are based upon light that has passed through different regions of the pupil of the photographic lens 2 are read out simultaneously.

Furthermore, in this second embodiment, also when attention is concentrated upon pixels 20 of the same color that are arranged in sequence in the same pixel column along the vertical direction, a first signal and a second signal that are based upon light that has passed through different regions of the pupil of the photographic lens 2 are read out simultaneously. For example, let attention be concentrated upon pixels 20G that are arranged in sequence along the vertical direction in the M-th column. When the vertical scan circuit 21 outputs the first control signal φTx1, a first charge is transferred to the FD region by the pixel 20G (P) in the (N+4)-th row and a first signal is generated. Moreover, a second charge is transferred to the FD region by the pixel 20G(S) in the (N+2)-th row and a second signal is generated. This first signal that has been generated by the pixel 20G (P) in the (N+4)-th row of the M-th column and this second signal that has been generated by the pixel 20G(S) in the (N+2)-th row of the M-th column are outputted to the same vertical signal line 25. And, when the vertical scan circuit 21 outputs the second control signal φTx2, a second charge is transferred to the FD region by the pixel 20G (P) in the (N+4)-th row and a second signal is generated. Moreover, a first charge is transferred to the FD region by the pixel 20G(S) in the (N+2)-th row and a first signal is generated. This second signal that has been generated by the pixel 20G (P) in the (N+4)-th row of the M-th column and this first signal that has been generated by the pixel 20G(S) in the (N+2)-th row of the M-th column are outputted to the same vertical signal line 25. The same is the case for the pixels 20G that are arranged in sequence in the vertical direction in the (M+1)-th through the (M+4)-th columns, the pixels 20B that are arranged in sequence in the vertical direction in the (M+1)-th column and the (M+3)-th column, and the pixels 20R that are arranged in sequence in the vertical direction in the M-th column, the (M+2)-th column, and the (M+4)-th column.

Figure 9A:
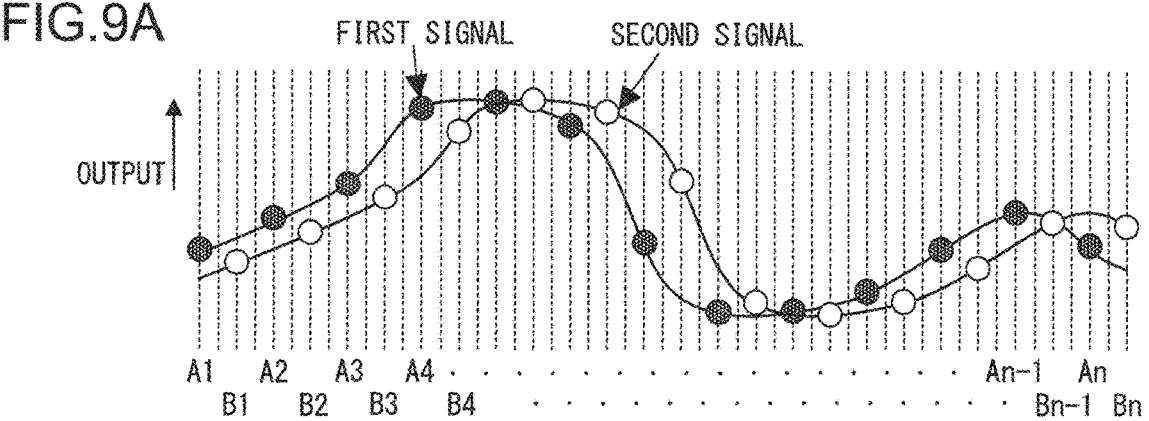
FIGS. 9A through 9D are figures each showing an example of group "a" signals and group "b" signals, in this second embodiment.

FIGS. 9A through 9D are figures showing examples of group "a" signals and group "b" signals, in this second embodiment. FIG. 9A is a figure showing group "a" signals that have been read out from the pixels 20G in the N-th row of FIG. 7, and group "b" signals that have been read out from these pixels 20G. In FIG. 9A, the n group "a" signals are shown as circles processed by cross hatching. Moreover, the n group "b" signals are shown as white circles. The group "a" signals and the group "b" signals from the pixels 20G are read out for every fourth column in FIG. 7, with the positions of the group "a" signals being offset from the positions of the group "b" signals by two columns. The vertical broken lines in FIG. 9A correspond to the pixel columns.

Figure 9B:
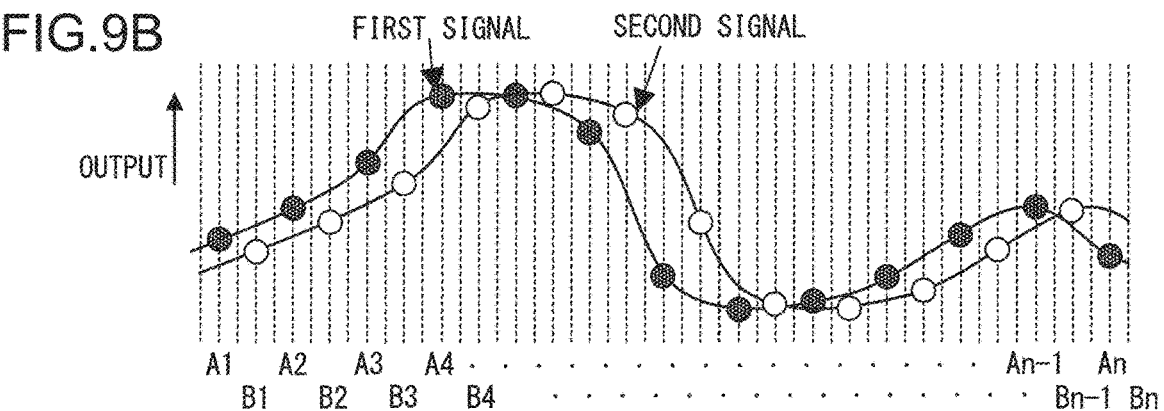
Figure 9C:
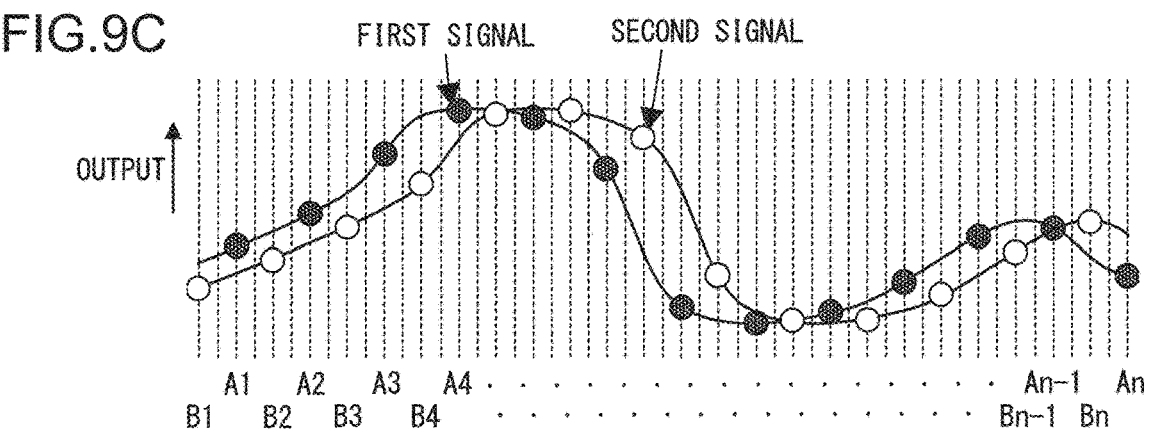
Figure 9D:
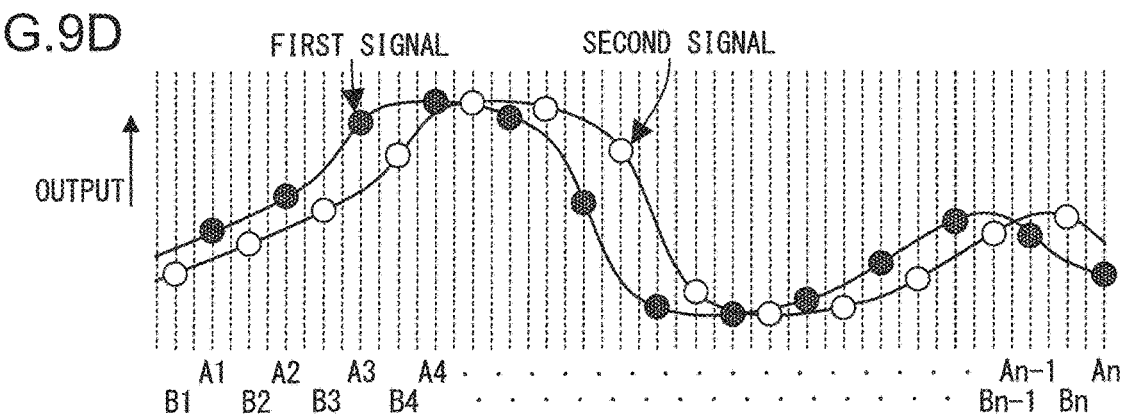

And FIG. 9B is a figure showing group "a" signals that have been read out from the pixels 20G in the (N+1)-th row of FIG. 7, and group "b" signals that have been read out from these pixels 20G. Moreover, FIG. 9C is a figure showing group "a" signals that have been read out from the pixels 20G in the (N+2)-th row of FIG. 7, and group "b" signals that have been read out from these pixels 20G. And FIG. 9D is a figure showing group "a" signals that have been read out from the pixels 20G in the (N+3)-th row of FIG. 7, and group "b" signals that have been read out from these pixels 20G. The feature that the n group "a" signals are shown as circles processed by cross hatching, the feature that the n group "a" signals are shown as white circles, and the feature that the vertical broken lines correspond to the pixel columns, are common to FIGS. 9(a) through 9(d).

According to FIGS. 9A through 9D, it is possible to eliminate bias in the sampling points. In concrete terms, in the first embodiment (refer to FIG. 6), whichever is the pixel row that the signals are read out from, the signals are the same as the signals in FIG. 9A. Due to this, there are some columns from which it is not possible to obtain signals from the pixels 20G. However, in this second embodiment, since the sampling points are shifted by one row between the signals that have been read out from the N-th row (FIG. 9A) and the signals that have been read out from the (N+1)-th row (FIG. 9B), between the signals that have been read out from the (N+1)-th row (FIG. 9B) and the signals that have been read out from the (N+2)-th row (FIG. 9C), and between the signals that have been read out from the (N+2)-th row (FIG. 9C) and the signals that have been read out from the (N+3)-th row (FIG. 9D), accordingly it becomes possible to obtain signals from the pixels 20G of each and every pixel column.

According to the second embodiment as described above, similar operations and beneficial effects to those obtained in the case of the first embodiment can be obtained. Moreover, as shown in FIGS. 9(a) through 9(d), it is possible to eliminate bias in the sampling points.

The Third Embodiment

In a third embodiment of the present invention as well, the arrangement of the pixels of type P and the pixels of type S is different, as compared to the first embodiment.

It should be understood that the camera 1 according to this third embodiment may also either be, or may not be, an exchangeable lens type camera, in a similar manner to the case with the first embodiment. Furthermore, this camera may also be built as an imaging device such as a smart phone or a video camera or the like.

Figure 10:
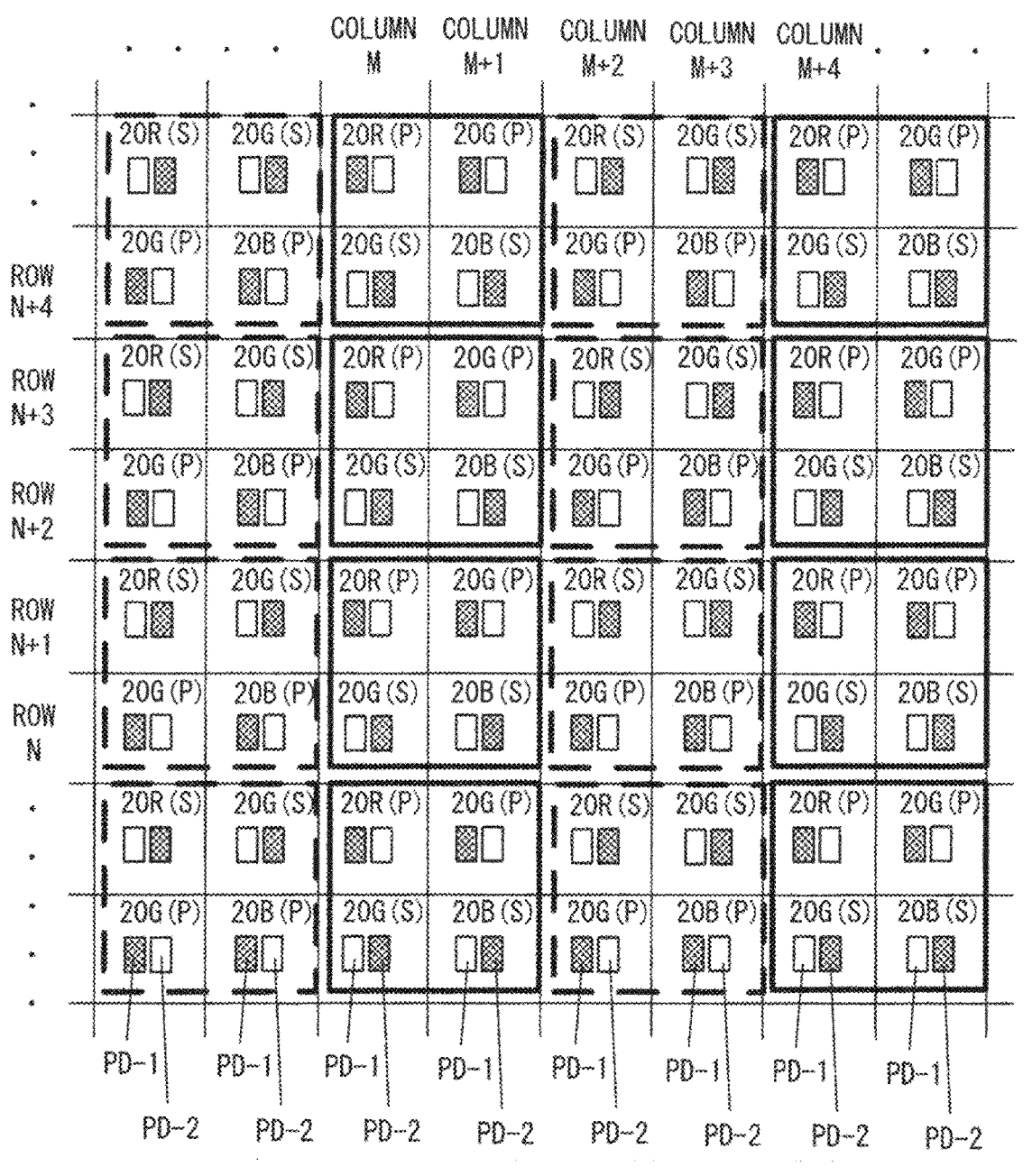

FIG. 10 is a figure showing an example of the arrangement of pixels on the image sensor 3 of the third embodiment. In FIG. 10, when attention is concentrated upon the 2×2 pixel squares which are the repeated units of the Bayer array, they may be divided into a group in which two pixels 20R (P) and 20G (P) of type P are disposed at the upper edges and two pixels 20G(S) and 20B(S) of type S are disposed at their lower edges in the repeated four-pixel units, and a group in which the two pixels 20R(S) and 20G(S) of type S are disposed at the upper edges and the two pixels 20G (P) and 20B (P) of type P are disposed at their lower edges in the repeated four-pixel units. Among these units, those in the former group are shown as surrounded by thick solid lines, while those in the latter group are shown as surrounded by thick broken lines.

It should be understood that, in FIG. 10, the micro lenses ML are omitted.

According to FIG. 10, the groups that are surrounded by the thick solid lines and the groups that are surrounded by the thin broken lines are arranged alternately in sequence in the row direction (i.e. the horizontal direction). Moreover, the groups that are surrounded by the thick solid lines and the groups that are surrounded by the thin broken lines are also arranged alternately in sequence in the column direction (i.e. the vertical direction).

Figure 11:
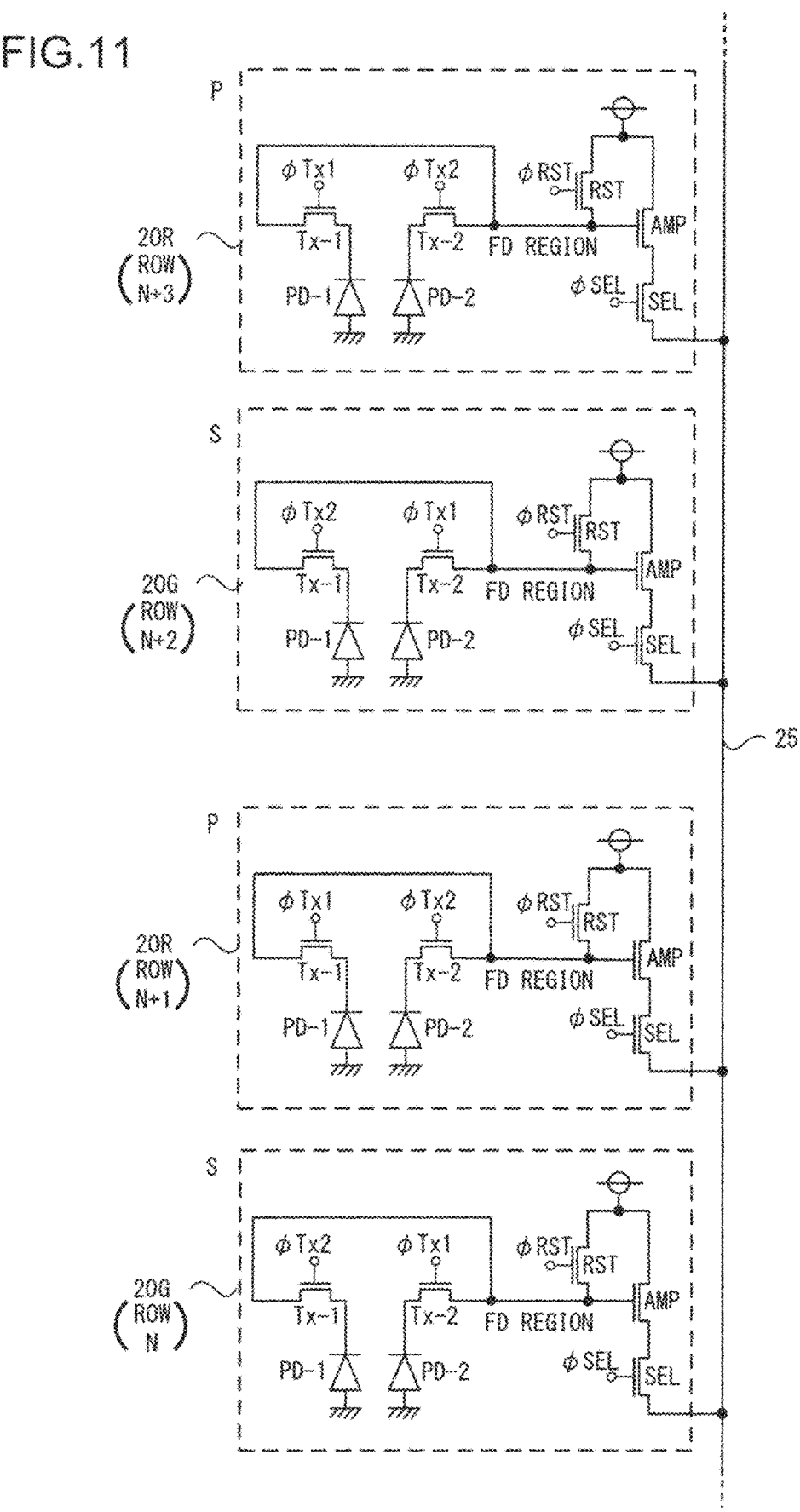
FIG. 11 is a circuit diagram for explanation of pixels arranged in a column M of FIG. 10.

FIG. 11 is a circuit diagram for explanation of pixels 20 arranged in a column M of FIG. 10 (i.e. arranged in sequence in the vertical direction), for example for explanation of a pixel 20G(S) of the N-th row, a pixel 20R (P) of the (N+1)-th row, a pixel 20G(S) of the (N+2)-th row, and a pixel 20R (P) of the (N+3)-th row. While the feature that each of the pixels 20 includes, behind a micro lens and a color filter not shown in the figures, a first photodiode PD-1 and a second photodiode PD-2 which serve as photoelectric conversion units, is the same as in the first embodiment, the feature that the pixels 20 arranged in sequence in the vertical direction in FIG. 10, in any column, are of different types alternately (the type P and the type S being alternately repeated) is different from the case of the first embodiment.

In each pixel 20 of FIG. 10, one of the first and second photodiodes PD-1 and PD-2 is picked out by cross hatching. Cross hatching on a photodiode indicates a photodiode for which charge generated by that photodiode is transferred to an FD region upon supply of a first control signal φTx1. And the absence of cross hatching on a photodiode indicates a photodiode for which charge generated by that photodiode is transferred to the FD region upon supply of a second control signal φTx2. For example, with a pixel 20G (P) of type P, when the first control signal φTx1 is supplied to a first transfer transistor Tx-1, a first charge generated by the first photodiode PD-1 is transferred to the FD region. And this means that a first signal is read out on the basis of this first charge that has been transferred to the FD region. Moreover, with such a pixel 20G (P) of type P, when the second control signal φTx2 is supplied to a second transfer transistor Tx-2, a second charge generated by the second photodiode PD-2 is transferred to the FD region. And this means that a second signal is generated on the basis of this second charge that has been transferred to the FD region. The same is the case for the pixels 20B (P) and 20R (P) of type P.

On the other hand, with a pixel 20G(S) of type S, when the first control signal φTx1 is supplied to a second transfer transistor Tx-2, a second charge generated by the second photodiode PD-2 of the pixel 20G(S) is transferred to the FD region. And this means that a second signal is read out on the basis of this second charge that has been transferred to the FD region. Moreover, with such a pixel 20G(S) of type S, when the second control signal φTx2 is supplied to a first transfer transistor Tx-1, a first charge generated by the first photodiode PD-1 is transferred to the FD region. And this means that a first signal is generated on the basis of this first charge that has been transferred to the FD region. The same is the case for the pixels 20B(S) and 20R(S) of type S.

As described above, light that has passed through different regions of the pupil of the photographic lens 2 is incident upon the first and second photodiodes PD-1 and PD-2 of the pixel 20. Moreover, as described above, the pixels 20 may be divided into the groups that are surrounded by thick solid lines and the groups that are surrounded by thick broken lines, and these groups are arranged alternately along the row direction (i.e. along the horizontal direction), and also each group is arranged continuously along the column direction (i.e. along the vertical direction). Due to this, when attention is concentrated upon pixels 20 of the same color that are arranged in sequence in the same pixel row along the horizontal direction, first signals and second signals that are based upon light that has passed through different regions of the pupil of the photographic lens 2 are read out simultaneously.

Furthermore, in this third embodiment, when attention is concentrated upon pixels 20 of the same color that are arranged in sequence in the same pixel column in the vertical direction, the first signals or the second signals are read out on the basis of light that has passed through the same region of the pupil of the photographic lens 2.

FIGS. 12(*a*) and 12(*b*) are figures showing examples of group "a" signals and group "b" signals, in this third embodiment. FIG. 12A is a figure showing group "a" signals that have been read out from the pixels 20G in the N-th row of FIG. 10, and group "b" signals that have been read out from these pixels 20G. In FIG. 12A, the n group "a" signals are shown as circles processed by cross hatching. Moreover, the n group "b" signals are shown as white circles. The group "a" signals and the group "b" signals from the pixels 20G are read out for every fourth column in FIG. 10, with the positions of the group "a" signals being offset from the positions of the group "b" signals by two columns. The vertical broken lines in FIG. 12A correspond to the pixel columns.

And FIG. 12B is a figure showing group "a" signals that have been read out from the pixels 20G in the (N+1)-th row of FIG. 10, and group "b" signals that have been read out from these pixels 20G. According to FIG. 12A and FIG. 12B, it is possible to reduce the bias of the sampling points. In concrete terms, in the first embodiment (refer to FIG. 6), the signals that are read out from any pixel row are similar to those shown in FIG. 9A. Due to this, there are columns for which it is not possible to obtain signals from the pixels 20G. However, in this third embodiment, since the sampling points for the signals that are read out from the N-th row (FIG. 12A) and the signals that are read out from the (N+1)-th row (FIG. 12B) are offset by one row, accordingly it becomes possible to obtain signals from the pixels 20G for any pixel column.

According to this third embodiment explained above, similar operations and beneficial effects are obtained to those obtained in the case of the first embodiment. Moreover, as shown in FIG. 12A and FIG. 12B, it is possible to reduce bias in the sampling points.

The following variants also come within the scope of the present invention; and it would also be possible to combine one or more of the following variant embodiments with one or more of the embodiments described above.

A First Variant Embodiment

Figure 13:
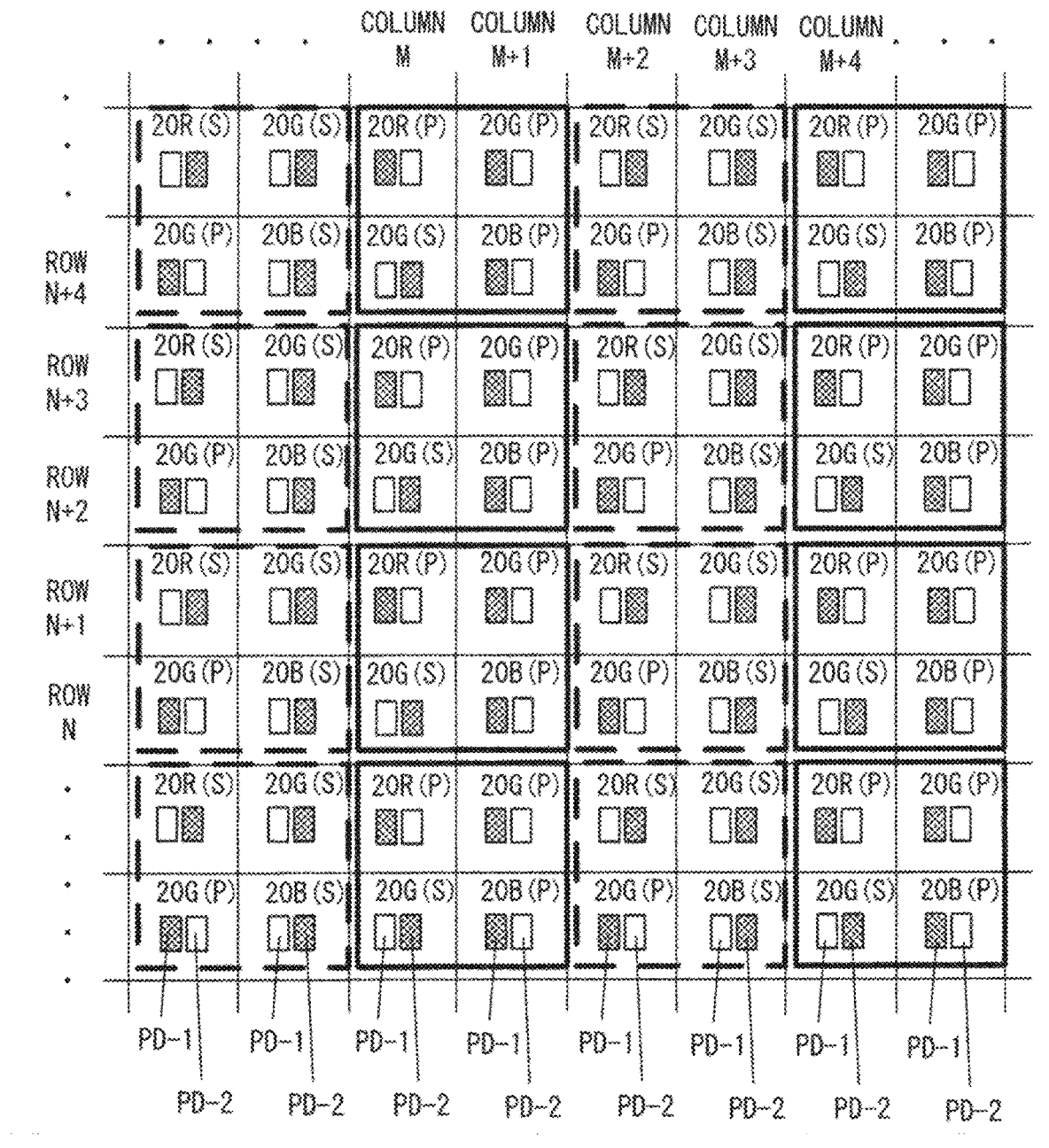

An example will now be explained in which, in a first variant of the third embodiment, by contrast with the arrangement of pixels of type P and pixels of type S in the third embodiment, a part thereof is made to be different. FIG. 13 is a figure showing an example of the arrangement of pixels of type P and pixels of type S on the image sensor 3 of this first variant of the third embodiment. In FIG. 13, when attention is concentrated upon the 2×2 pixel squares which are the repeated units of the Bayer array, they may be divided into a group in which two pixels 20R (P) and 20G (P) of type P are disposed at the upper edges and two pixels 20G(S) of type S and 20B (P) of type P are disposed at their lower edges in the repeated four-pixel units, and a group in which the two pixels 20R(S) and 20G(S) of type S are disposed at the upper edges and the two pixels 20G (P) of type P and 20B(S) of type S are disposed at their lower edges in the repeated four-pixel units. Among these units, those in the former group are shown as surrounded by thick solid lines, while those in the latter group are shown as surrounded by thick broken lines.

It should be understood that, in FIG. 13, the micro lenses ML are omitted.

According to FIG. 13, the groups that are surrounded by the thick solid lines and the groups that are surrounded by the thin broken lines are arranged alternately in sequence in the row direction (i.e. the horizontal direction). Moreover, the groups that are surrounded by the thick solid lines and the groups that are surrounded by the thin broken lines are both arranged continuously in sequence in the column direction (i.e. the vertical direction).

Although no circuit diagram is given in the figures for explanation of the pixels lined up in sequence in the same column in the vertical direction, the feature that each of the pixels 20 includes, behind a micro lens and a color filter not shown in the figures, a first photodiode PD-1 and a second photodiode PD-2 which serve as photoelectric conversion units, is the same as in the third embodiment.

Furthermore the feature that, in FIG. 13, columns in which the types of the pixels arranged along the vertical direction are different for each pixel in sequence (with type P and type S repeatedly alternating), and columns in which pixels of type P or pixels of type S are stacked in sequence in the vertical direction, appear alternately, is different from the case of the third embodiment.

In each pixel 20 of FIG. 13, one of the first and second photodiodes PD-1 and PD-2 is picked out by cross hatching. Cross hatching on a photodiode indicates a photodiode for which charge generated by that photodiode is transferred to an FD region upon supply of a first control signal φTx1. And the absence of cross hatching on a photodiode indicates a photodiode for which charge generated by that photodiode is transferred to the FD region upon supply of a second control signal φTx2. For example, with a pixel 20G (P) of type P, when the first control signal φTx1 is supplied to a first transfer transistor Tx-1, a first charge generated by the first photodiode PD-1 is transferred to the FD region. And this means that a first signal is read out on the basis of this first charge that has been transferred to the FD region. Moreover, with such a pixel 20G (P) of type P, when the second control signal φTx2 is supplied to a second transfer transistor Tx-2, a second charge generated by the second photodiode PD-2 is transferred to the FD region. And this means that a second signal is generated on the basis of this second charge that has been transferred to the FD region. The same is the case for the pixels 20B (P) and 20R (P) of type P.

On the other hand, with a pixel 20G(S) of type S, when the control signal φTx1 is supplied to a second transfer transistor Tx-2, a second charge generated by the second photodiode PD-1 of the pixel 20G(S) is transferred to the FD region. And this means that a second signal is read out on the basis of this second charge that has thus been transferred. Moreover, with such a pixel 20G(S) of type S, when the second control signal φTx2 is supplied to a first transfer transistor Tx-1, a first charge generated by the first photodiode PD-1 is transferred to the FD region. And this means that a first signal is generated on the basis of this first charge that has been thus transferred. The same is the case for the pixels 20B(S) and 20R(S) of type S.

As described above, light that has passed through different regions of the pupil of the photographic lens 2 is incident upon the first and second photodiodes PD-1 and PD-2 of the pixel 20. Moreover, as described above, the pixels 20 may be divided into the groups that are surrounded by thick solid lines and the groups that are surrounded by thick broken lines, and these groups are arranged alternately along the row direction (i.e. along the horizontal direction), and also each group is arranged continuously along the column direction (i.e. along the vertical direction). Due to this, when attention is concentrated upon pixels 20 of the same color that are arranged in sequence in the same pixel row along the horizontal direction, first signals and second signals that are based upon light that has passed through different regions of the pupil of the photographic lens 2 are read out simultaneously.

Furthermore, in this third embodiment, when attention is concentrated upon pixels 20 of the same color that are arranged in sequence in the same pixel column in the vertical direction, the first signals or the second signals are read out on the basis of light that has passed through the same region of the pupil of the photographic lens 2.

In this first variant of the third embodiment, the group "a" signals that are read out from the pixels 20G of the N-th row and the group "b" signals that are read out from the pixels 20G are the same as in FIG. 12A. Moreover, in this first variant of the third embodiment, the group "a" signals that are read out from the pixels 20G of the (N+1)-th row and the group "b" signals that are read out from the pixels 20G are the same as in FIG. 12B.

According to this first variant of the third embodiment as explained above, since the signals that are read out from the N-th row (refer to FIG. 12A) and the signals that are read out from the (N+1)-th row (refer to FIG. 12B) are offset by one row, accordingly it is possible to obtain signals from pixels 20G in any pixel column. Due to this, it is possible to reduce bias in the sampling points.

In the first embodiment, the second embodiment, and the third embodiment and its variant described above, various arrangements of pixels of type P and pixels of type S in the 2×2 pixel units that are repeated in the Bayer array have been explained. However, these are only examples; when attention is concentrated upon pixels 20 of the same color that are lined up in sequence in the horizontal direction in the same pixel row, any appropriate changes may be made to part of the arrangement of the pixels of type P and the pixels of type S, provided that, for any pixel row, it is possible to read out simultaneously a first signal and a second signal that are based upon light that has passed through different regions of the photographic lens 2.

A Second Variant Embodiment

Figure 18:
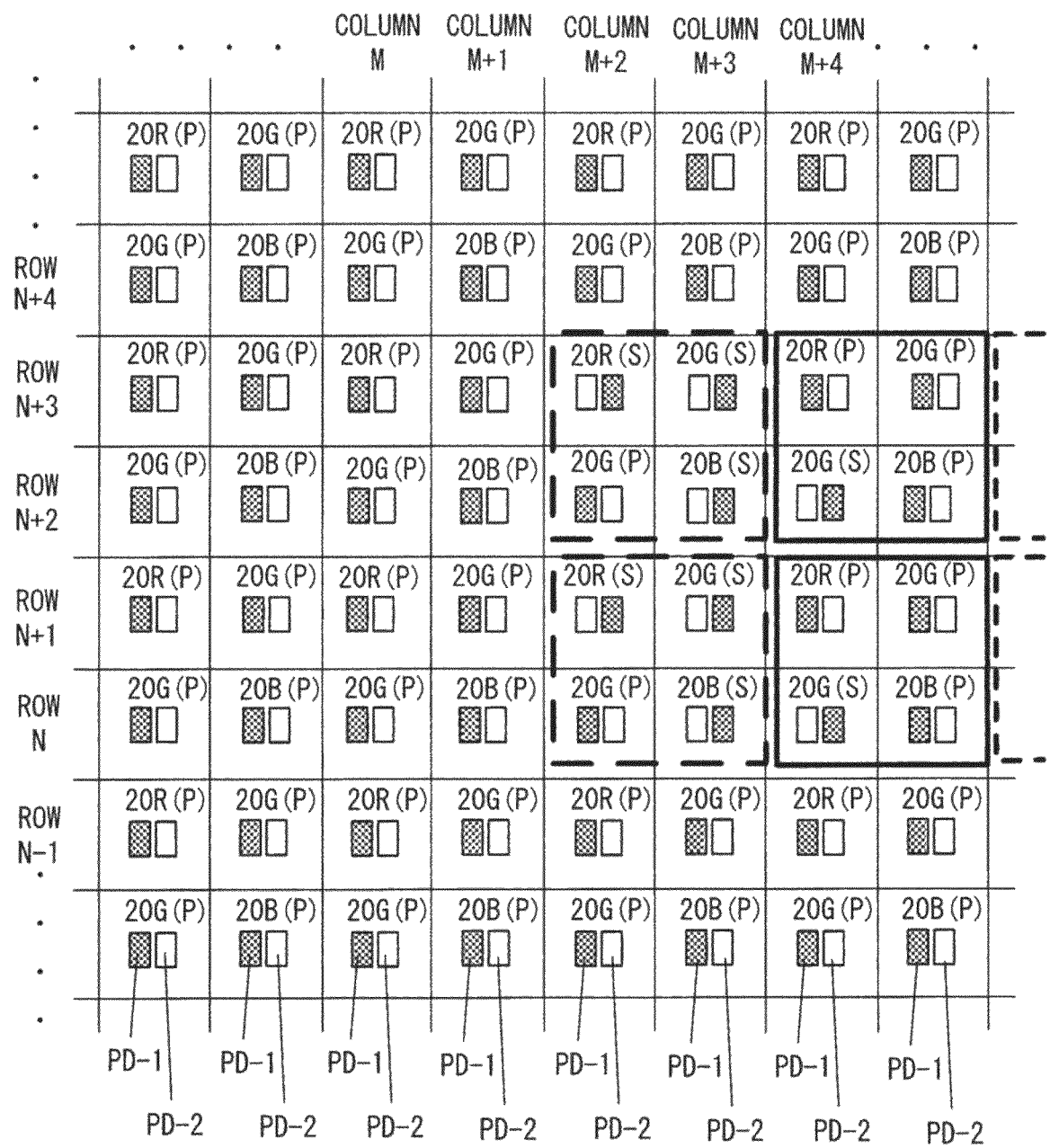
FIG. 18 is a figure showing an example of a pixel arrangement in a second variant of the third embodiment.

It would also be acceptable to provide the arrangement of the pixels of type P and the pixels of type S in the repeated 2×2 pixel units of the Bayer array described above in a part of the image capture region 31 (refer to FIG. 2). In a second variant of the third embodiment, for example, pixels of type P are disposed over the entire area of the image capture region 31, and, in a region within this image capture region corresponding to a focusing area, those pixels are replaced with the pixel arrangement explained in connection with the first embodiment, the second embodiment, or the third embodiment or its first variant. FIG. 18 is a figure for explanation of a pixel arrangement in which the region from the N-th through the (N+3)-th row and from the (M+2)-th column to the right side, which corresponds to a focusing area, has been replaced by the pixel arrangement of FIG. 13.

According to this second variant of the third embodiment, it is possible to arrange the pixels of type P and the pixels of type S in the repeated 2×2 pixel units of the Bayer array described above in a restricted manner.

It should be understood that it would also be acceptable to dispose pixels of type S over the entire area of the image capture region 31, and, in a region within this region corresponding to a focusing area, to replace those pixels with the pixel arrangement explained in connection with the first embodiment, the second embodiment, or the third embodiment or its first variant.

Concentrating attention upon the pixels 20G (P) of the N-th row and the (M+2)-th column, the pixels 20B(S) of the N-th row and the (M+3)-th column, the pixel 20G (P) of the N-th row and the M-th column, and the pixel 20B (P) of the N-th row and the (M+1)-th column, the image sensor 3 of the second variant of the third embodiment includes image sensors of the following patterns.

(1) The image sensor 3 comprises pixels 20G (P), pixels 20B(S), pixels 20G (P), and pixels 20B (P), each of which comprises a micro lens ML, a first photodiode PD-1, a second photodiode PD-2, an FD region, a first transfer transistor Tx-1, and a second transfer transistor Tx-2. And the vertical scan circuit 21 outputs the first control signal φTx1 that causes the first charge of the pixel 20G (P) and the first charge of the pixel 20B (P) to be transferred to the FD region, to the first transfer transistor Tx-1 of the pixel 20G (P), and to the first transfer transistor Tx-1 of the pixel 20B (P), and also outputs the second control signal φTx2 that causes the second charge of the pixel 20G (P) and the second charge of the pixel 20B (P) to be transferred to the FD region, to the second transfer transistor Tx-2 of the pixel 20G (P), and to the second transfer transistor Tx-2 of the pixel 20B (P).

(2) Moreover, in the image sensor 3 of (1) described above, the vertical scan circuit 21 outputs the first control signal φTx1 that causes the first charge of the pixel 20G (P), the second charge of the pixel 20B(S), the first charge of the pixel 20G (P), and the first charge of the pixel 20B (P) to be transferred to the FD region, to the first transfer transistor Tx-1 of the pixel 20G (P), to the second transfer transistor Tx-2 of the pixel 20B (S), to the first transfer transistor Tx-1 of the pixel 20G (P), and to the first transfer transistor Tx-1 of the pixel 20B (P).

(3) Furthermore, in the image sensor 3 of (2) described above, the vertical scan circuit 21 outputs the first control signal φTx1 that causes the first charge of the pixel 20G (P) to be transferred to the FD region, causes the second charge of the pixel 20B(S) to be transferred to the FD region, causes the first charge of the pixel 20G (P) to be transferred to the FD region, and causes the first charge of the pixel 20B (P) to be transferred to the FD region.

(4) Yet further, in the image sensor 3 of (2) or (3) described above, the vertical scan circuit 21 outputs the first control signal φTx1 via the control signal line 23 that connects the vertical scan circuit 21, the first transfer transistor Tx-1 of the pixel 20G (P), the second transfer transistor Tx-2 of the pixel 20B(S), the first transfer transistor Tx-1 of the pixel 20G (P), and the first transfer transistor Tx-1 of the pixel 20B (P).

(5) Still further, in the image sensor 3 of any one of (2) through (4) described above, the vertical scan circuit 21 outputs the second control signal φTx2 that causes the second charge of the pixel 20G (P), the first charge of the pixel 20B(S), the second charge of the pixel 20G (P), and the second charge of the pixel 20B (P) to be transferred to the FD region, to the second transfer transistor Tx-2 of the pixel 20G (P), to the first transfer transistor Tx-1 of the pixel 20B(S), to the second transfer transistor Tx-2 of the pixel 20G (P), and to the second transfer transistor Tx-2 of the pixel 20B (P).

(6) Even further, in the image sensor 3 of (5) described above, the vertical scan circuit 21 outputs the second control signal φTx2 that causes the second charge of the pixel 20G (P) to be transferred to the FD region, causes the first charge of the pixel 20B(S) to be transferred to the FD region, causes the second charge of the pixel 20G (P) to be transferred to the FD region, and causes the second charge of the pixel 20B (P) to be transferred to the FD region, to the second transfer transistor Tx-2 of the pixel 20G (P), to the first transfer transistor Tx-1 of the pixel 20B(S), to the second transfer transistor Tx-2 of the pixel 20G (P), and to the second transfer transistor Tx-2 of the pixel 20B (P).

(7) Moreover, in the image sensor 3 of (5) or (6) described above, the vertical scan circuit 21 outputs the second control signal φTx2 via the control signal line 23 that connects the vertical scan circuit 21, the second transfer transistor Tx-2 of the pixel 20G (P), the first transfer transistor Tx-1 of the pixel 20B(S), the second transfer transistor Tx-2 of the pixel 20G (P), and the second transfer transistor Tx-2 of the pixel 20B (P), to the second transfer transistor Tx-2 of the pixel 20G (P), the first transfer transistor Tx-1 of the pixel 20B(S), the second transfer transistor Tx-2 of the pixel 20G (P), and the second transfer transistor Tx-2 of the pixel 20B (P).

(8) In the image sensor 3 described above, the pixel 20G (P), the pixel 20B(S), the pixel 20G (P), and the pixel 20B (P) are arranged along the row direction (i.e. along the horizontal direction), and the first photodiodes PD-1 and the second photodiodes PD-2 are arranged in sequence along the row direction (i.e. along the horizontal direction).

Furthermore, when attention is concentrated upon the pixel 20G (P) in the N-th row and the (M+2)-th column, the pixel 20B(S) in the N-th row and the (M+3)-th column, the pixel 20R (P) in the (N−1)-th row and the (M+2)-th column, and the pixel 20G (P) in the (N−1)-th row and the (M+3)-th column of FIG. 18, the image sensor 3 of this second variant of the third embodiment includes image sensors according to the following patterns.

(9) The image sensor 3 comprises pixels 20G (P), pixels 20B(S), pixels 20R (P), and pixels 20G (P), each of which comprises a micro lens ML, a first photodiode PD-1, a second photodiode PD-2, an FD region, a first transfer transistor Tx-1, and a second transfer transistor Tx-2. And the vertical scan circuit 21 outputs the first control signal φTx1 for the N-th row that causes the first charge of the pixel 20G (P) and the second charge of the pixel 20B(S) to be transferred to the FD region, to the first transfer transistor Tx-1 of the pixel 20G (P) and to the second transfer transistor Tx-2 of the pixel 20B(S), and also outputs the first control signal φTx1 for the (N−1)-th row that causes the first charge of the pixel 20R (P) and the first charge of the pixel 20G (P) to be transferred to the FD region, to the first transfer transistor Tx-1 of the pixel 20R (P) and to the first transfer transistor Tx-1 of the pixel 20G (P).

(10) In the image sensor 3 of (9) described above, the vertical scan circuit 21 outputs the first control signal φTx1 for the N-th row that causes the first charge of the pixel 20G (P) to be transferred to the FD region and causes the second charge of the pixel 20B(S) to be transferred to the FD region, and also outputs the first control signal φTx1 for the (N−1)-th row that causes the first charge of the pixel 20R (P) to be transferred to the FD region and causes the first charge of the pixel 20G (P) to be transferred to the FD region.

(11) In the image sensor 3 of (9) or (10) described above, the vertical scan circuit 21 outputs the first control signal φTx1 for the N-th row via the control signal line 23 for the N-th row that connects the vertical scan circuit 21, the first transfer transistor Tx-1 of the pixel 20G (P), and the second transfer transistor Tx-2 of the pixel 20B(S), and also outputs the first control signal φTx1 for the (N−1)-th row via the control signal line 23 for the (N−1)-th row that connects the vertical scan circuit 21, the first transfer transistor Tx-1 of the pixel 20R (P), and the first transfer transistor Tx-1 of the pixel 20G (P).

(12) In the image sensor 3 of any one of (9) through (11) described above, the vertical scan circuit 21 outputs the second control signal φTx2 for the N-th row that causes the second charge of the pixel 20G (P) and the first charge of the pixel 20B(S) to be transferred to the FD region, to the second transfer transistor Tx-2 of the pixel 20G (P) and to the first transfer transistor Tx-1 of the pixel 20B(S), and also outputs the second control signal φTx2 for the (N−1)-th row that causes the second charge of the pixel 20R (P) and the second charge of the pixel 20G (P) to be transferred to the FD region, to the second transfer transistor Tx-2 of the pixel 20R (P) and to the second transfer transistor Tx-2 of the pixel 20G (P).

(13) In the image sensor 3 of (12) described above, the vertical scan circuit 21 outputs the second control signal φTx2 for the N-th row that causes the second charge of the pixel 20G (P) to be transferred to the FD region and also causes the first charge of the pixel 20B(S) to be transferred to the FD region, and also outputs the second control signal φTx2 for the (N−1)-th row that causes the second charge of the pixel 20R (P) to be transferred to the FD region and also causes the second charge of the pixel 20G (P) to be transferred to the FD region.

(14) In the image sensor 3 of (12) or (13) described above, the vertical scan circuit 21 outputs the second control signal φTx2 via the control signal line 23 for the N-th row that connects the vertical scan circuit 21, the second transfer transistor Tx-2 of the pixel 20G (P), and the first transfer transistor Tx-1 of the pixel 20B(S), and also outputs the second control signal φTx2 via the control signal line 23 for the (N−1)-th row that connects the second transfer transistor Tx-2 of the pixel 20R (P) and the second transfer transistor Tx-2 of the pixel 20G (P).

(15) The image sensor 3 described above has the N-th pixel row in which the pixels 20G (P) and the pixels 20B(S) are arranged along the row direction (i.e. along the horizontal direction) and the (N−1)-th pixel row in which the pixels 20R (P) and the pixels 20G (P) are arranged along the row direction (i.e. along the horizontal direction), and the first photodiodes PD-1 and the second photodiodes PD-2 are arranged in sequence along the row direction (i.e. along the horizontal direction).

A Third Variant Embodiment

In a third variant of the third embodiment, the addition of signals between the pixels 20 of the same color that are arranged in sequence in the column direction (i.e. in the vertical direction) will now be explained, as compared with the third embodiment and the first variant of the third embodiment.

Addition of signals between the pixels 20 is appropriate if, for example, the signal level is to be enhanced when the luminance of the photographic subject is low. When this is applied in the case of reading out a first signal and a second signal based upon light that has passed through different regions of the pupil of the photographic lens 2, it is possible to increase the S/N ratio of the signals when they are used for image deviation detection calculation processing, so that it is possible to enhance the accuracy of the defocusing amount that is calculated.

When performing signal addition between pixels 20 of the same color that are arranged in sequence in the column direction (i.e., in the vertical direction), for example, (1) vertical signal line addition and also (2) FD addition are preferred. It would also be acceptable to employ either 1) vertical signal line addition or (2) FD addition.

(1) Vertical Signal Line Addition

Vertical signal line addition is signal addition that is performed upon a vertical signal line 25 (refer to FIG. 2). For example, signals may be added between pixels 20 of the same color by selecting, with the selection transistors SEL, pixels 20G in FIG. 11 that are of the same color and moreover of the same type (for example, type S) of the N-th row and of the (N+2)-th row.

Here, the reason for adding together signals between pixels 20 of the same color is in order to avoid mixing together signals that are based upon light of other colors. Furthermore, the reason for adding together signals between pixels 20 of the same type (for example, of type S) is in order to avoid mixing together first signals and second signals based upon light that has passed through different regions of the pupil of the photographic lens 2.

(2) FD Addition

For FD addition, for example, a connecting transistor (not shown in the figures) may be provided between the FD regions of a pixel 20G of the N-th row and a pixel 20G of the (N+2)-th row in FIG. 11 that are of the same color and moreover of the same type (for example, type S), and this implies adding together the charges that are generated by this plurality of pixels whose FD regions are connected together. And a signal based upon the charges that have been added together in this manner is read out as the signal of the rows that have been selected by the selection transistors SEL (the N-th row or the (N+2)-th row).

The vertical scan circuit 21 changes over between performing, and not performing, signal addition, by turning OFF the connecting transistor if signal addition is not being performed, and turning it ON if signal addition is to be performed.

Here, the reason for adding together charges between pixels 20 of the same color is in order to avoid mixing together charges that are based upon light of other colors. Furthermore, the reason for adding together charges between pixels 20 of the same type (for example, of type S) is in order to avoid mixing together charges based upon light that has passed through different regions of the pupil of the photographic lens 2.

The Fourth Embodiment

In a fourth embodiment of the present invention, processing for enhancing the accuracy of the image deviation detection calculation processing will be explained. The camera 1 according to this fourth embodiment may either be, or may not be, an exchangeable lens type camera, in a similar manner to the cases with the first through the third embodiments. Furthermore, this camera may also be built as an imaging device such as a smart phone or a video camera or the like.

In the first through third embodiments described above, since priority is accorded to proceeding more quickly with the image deviation detection calculation processing, accordingly the imaging control unit 4 obtains the group "a" signals and the group "b" signals by reading out the pixel rows only once (either only by the first reading out or only by the second reading out). In this case, since the gap between the signals of the group "a" signals and the group "b" signals from the pixels 20G is three columns, as shown in the examples of FIG. 5, FIGS. 9A-9D, and FIGS. 12A and 12B, accordingly the image deviation detection calculation processing is performed on the basis of the group "a" signals and the group "b" signals, once every four columns.

On the other hand, in this fourth embodiment, priority is accorded to enhancing the accuracy of the image deviation calculation processing. For this, the imaging control unit 4 obtains the group "a" signals and the group "b" signals by reading out each of the pixel rows twice (in the first reading out and also in the second reading out).

FIGS. 14(a) through 14(c) are figures showing examples of group "a" signals and group "b" signals of the fourth embodiment. FIG. 14A is a figure showing the group "a" signals that have been read out from pixels 20G of the N-th row of FIG. 3 and FIG. 5 and the group "b" signals that have been read out from pixels 20G of the N-th row of FIG. 3 and FIG. 5 by first control signals φTx1 being supplied on the first reading out. In FIG. 14A, the n group "a" signals are shown as circles processed by cross hatching. Moreover, the n group "b" signals are shown as white circles. The group "a" signals and the group "b" signals from the pixels 20G are read out for every fourth column in FIG. 14A, with the positions of the group "a" signals and those of the group "b" signals being offset by two columns. The vertical broken lines in FIG. 14A correspond to the pixel columns. The group "a" signals and the group "b" signals resulting from this first reading out are stored in the memory 7.

After the potentials of the FD regions have been reset after the first reading out, second control signals φTx2 are supplied for the second reading out.

FIG. 14B is a figure showing the group "a" signals and the group "b" signals that have been read out during the second reading out from the same pixels as in the case of the first reading out, in other words the group "a" signals that have been read out from the pixels 20G of the N-th row of FIG. 3 and FIG. 5 and the group "b" signals have been read out from the pixels 20G of the N-th row of FIG. 3 and FIG. 5. According to FIG. 14A and FIG. 14B, a first signal and a second signal are read out from each of the pixels 20G on the basis of light that has passed through different regions of the pupil of the photographic lens 2. The group "a" signals and the group "b" signals resulting from this second reading out are also stored in the memory 7.

The microprocessor 9 superimposes the group "a" signals due to the first reading out and the group "a" signals due to the second reading out that are stored in the memory 7, and thereby generates group "a" signals in which the first signals from the first photodiodes PD-1 of the pixels 20G that are arranged in the N-th row of FIG. 3 are arranged in sequence in the order of arrangement of the pixels 20G. And, in a similar manner, the microprocessor 9 superimposes the group "b" signals due to the first reading out and the group "b" signals due to the second reading out that are stored in the memory 7, and thereby generates group "b" signals in which the second signals from the second photodiodes PD-2 of the pixels 20G that are arranged in the N-th row of FIG. 3 are arranged in sequence in the order of arrangement of the pixels 20G.

FIG. 14C is a figure in which the group "a" signals and the group "b" signals of FIG. 14A and the group "a" signals and the group "b" signals of FIG. 14B are combined, with their pixel columns aligned. The total of 2n signals consisting of the two sets of n first signals A1, A2, . . . . An combined will now be newly referred to as the "first signals a1, a2, . . . a2n". Moreover, the total of 2n signals consisting of the two sets of n second signals B1, B2, . . . . Bn combined will now be newly referred to as the "second signals b1, b2, . . . b2n".

According to FIG. 14C, each of the first signal set and the second signal set after this combination now consists of one signal every other column.

By performing image deviation detection calculation processing (correlation calculation processing and phase difference detection processing), the focus calculation unit 10 calculates the amount of deviation of the plurality of images on the basis of the first signals and the second signals after they have been combined as described above, and then calculates the defocusing amount by multiplying this amount of deviation by a predetermined calculation coefficient.

Since, in this fourth embodiment, the densities (i.e. resolutions) of the first signals and the second signals that are employed for the image deviation detection calculation processing are higher as compared to the case in which the image deviation detection calculation processing proceeds more quickly, accordingly the accuracy of the image deviation detection calculation processing is increased, in particular in the case of a photographic subject that includes many high frequency spatial components. Due to this, it is possible to perform focus adjustment at high accuracy.

According to the fourth embodiment explained above, the following operations and beneficial effects are obtained. That is, this camera 1, which is an example of an imaging device, comprises: the image sensor 3; the focus calculation unit 10 that controls the position of the focusing lens on the basis of at least one set of the first signal based upon the first charge of the pixel 20G (P) and the second signal based upon the second charge of the pixel 20G(S), and the second signal based upon the second charge of the pixel 20G (P) and the first signal based upon the first charge of the pixel 20G(S), all outputted from the image sensor 3 that captures an image formed by the photographic lens 2 that incorporates the focusing lens, so that an image formed by the photographic lens 2 is focused upon the image sensor 3; the microprocessor 9; and the lens control unit 2a. Due to this, it is possible to perform focus adjustment with good accuracy.

The Fifth Embodiment

In the fifth embodiment of the present invention, according to a condition that is determined in advance, changeover is performed between a first mode in which focus adjustment is performed on the basis of the first signals and the second signals of FIG. 14A or FIG. 14B, and a second mode in which focus adjustment is performed on the basis of the first signals and the second signals shown in FIG. 14C. In other words, in the first mode, focus adjustment calculation is performed on the basis of the first and second signals that have been read out by the first reading out (or by the second reading out). And, in the second mode, focus adjustment calculation is performed on the basis of combined first signals in which the first signals that are read out by the first reading out and by the second reading out are combined, and combined second signals in which the second signals that are read out by the first reading out and by the second reading out are combined. Since, in the first mode, the focus adjustment calculation is performed on the basis of the first signals and the second signals resulting from the first reading out (or from the second reading out), accordingly the time period for reading out of signals is shorter than in the case of the second mode. Moreover, in the first mode, since the number of the first and the second signals that are employed for the focus adjustment calculation is smaller than in the case of the second mode, accordingly it is possible to perform the focus adjustment calculation at a higher speed than in the case of the second mode. In other words, the first mode is a mode in which the speed of auto focusing is accorded priority. On the other hand, in the second mode, the accuracy of focus adjustment is higher than in the case of the first mode, since the focus adjustment calculation is performed on the basis of the first signals and the second signals resulting both from the first reading out and also from the second reading out. In other words, in the second mode, it is possible to perform the focus adjustment calculation with better accuracy than in the case of the first mode, since the number of the first signals and the second signals that are employed for the focus adjustment calculation is greater than in the case of the first mode. In other words, the second mode is a mode in which the accuracy of auto focusing is accorded priority.

The camera 1 according to this fifth embodiment also may either be, or may not be, an exchangeable lens type camera, in a similar manner to the case with the first through the fourth embodiments. Furthermore, it may also be built as an imaging device such as a smart phone or a video camera or the like.

A first example of the operation of the fifth embodiment will now be explained.

A First Example

In this first example, the first mode is employed if the defocusing amount is greater than a predetermined value, while the second mode is employed if the defocusing amount is less than or equal to the predetermined value. This is because, when the defocusing amount is larger than the predetermined value, there is a tendency for the image of the photographic subject to include many low frequency components due to blurring, as shown in FIG. 14A, so that focus adjustment is performed according to the first mode on the basis of the first signals and the second signals whose signal pitch (sampling pitch) is large. But, when the defocusing amount is less than or equal to the predetermined value, then there is a tendency for the image of the photographic subject to include many high frequency components, as shown in FIG. 14C, so that focus adjustment is performed according to the second mode on the basis of the combined first signals and the combined second signals, whose signal pitch (sampling pitch) is small.

Figure 15:
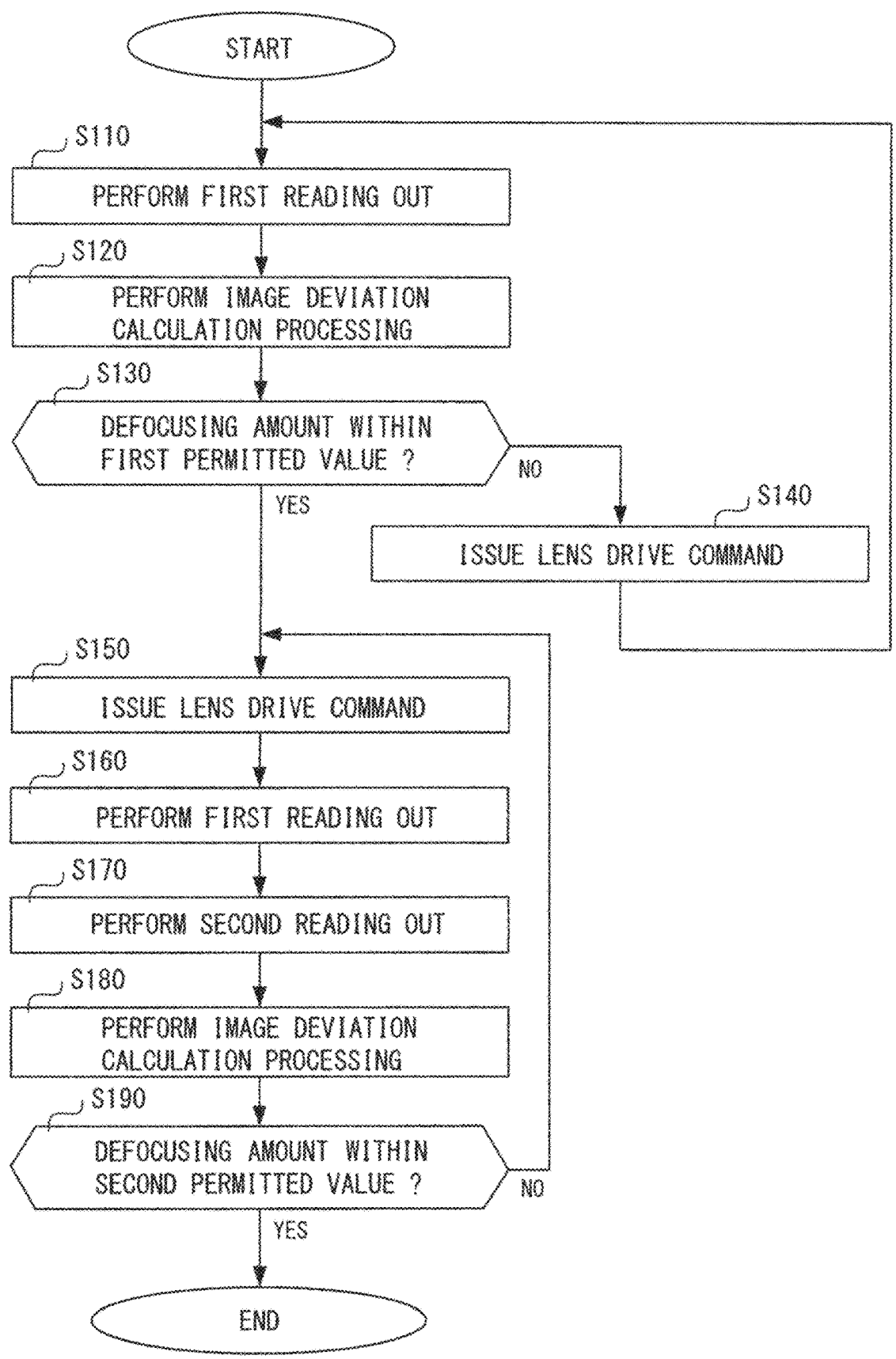
FIG. 15 is a flow chart for explanation of a flow of processing executed by a microprocessor.

In this manner, the microprocessor 9 changes over between the first mode and the second mode according to the magnitude of the defocusing amount. FIG. 15 is a flow chart for explanation of the flow of processing that is executed by the microprocessor 9 when issuing a command to the imaging control unit 4 for focus adjustment. The microprocessor 9 starts the processing shown in FIG. 15 when, for example, an actuation signal is inputted from the actuation unit 9a showing that the release button has been actuated by being half pressed.

In step S110, the microprocessor 9 causes the imaging control unit 4 to perform the first reading out. Due to this first reading out, the first signals are read out from the pixels 20G of type P, and the second signals are read out from the pixels 20G of type S.

It should be understood that the second reading out may be performed instead of the first reading out. In this second reading out, the second signals are read out from the pixels 20G of type P, and the first signals are read out from the pixels 20G of type S.

In step S120, the microprocessor 9 causes the focus calculation unit 10 to perform image deviation detection calculation processing. Due to this, as shown by way of example in FIG. 14A, the focus calculation unit 10 calculates the defocusing amount on the basis of the group "a" signals which consist of a plurality of first signals and the group "b" signals which consist of a plurality of second signals. When the second reading out has been performed in step S110, as shown by way of example in FIG. 14B, the focus calculation unit 10 calculates the defocusing amount on the basis of the group "a" signals and the group "b" signals.

In step S130, the microprocessor 9 makes a decision as to whether or not the defocusing amount is within a first permitted value. This first permitted value is a value that is greater than a second permitted value indicating the focusing state that will be described hereinafter, and is a value that is estimated to be adequate for a predetermined amount of high frequency components to be included in the image of the photographic subject upon the pixels 20. If the defocusing amount is within the first permitted value, then it is appropriate for focus adjustment in the second mode to be performed, so the microprocessor 9 reaches an affirmative decision in step S130 and the flow of control is transferred to step S150. On the other hand, if the defocusing amount exceeds the first permitted value, then it is appropriate for focus adjustment in the first mode to be performed, so the microprocessor 9 reaches a negative decision in step S130 and the flow of control proceeds to step S140.

In step S140 to which the flow of control proceeds when focus adjustment is to be performed in the first mode, the microprocessor 9 sends a lens drive command to the lens control unit 2a. Due to this, the lens control unit 2a shifts the focusing lens to a position (the focused position) for which the defocusing amount is within the first permitted value. When the focusing lens is shifted, the microprocessor 9 returns the flow of control to step S110 and repeats the processing described above.

In step S150 to which the flow of control proceeds when focus adjustment is to be performed in the second mode, the microprocessor 9 sends a lens shifting command to the lens control unit 2a. Due to this, the lens control unit 2a shifts the focusing lens on the basis of the defocusing amount calculated in step S120.

In step S160, the microprocessor 9 causes the imaging control unit 4 to perform the first reading out. Due to this first reading out, the first signals are read out from the pixels 20G of type P, and the second signals are read out from the pixels 20G of type S.

In step S170, the microprocessor 9 causes the imaging control unit 4 to perform the second reading out. Due to this second reading out, the second signals are read out from the pixels 20G of type P, and the first signals are read out from the pixels 20G of type S. The first signals from this second reading out are combined with the first signals due to the first reading out in step S160, and thereby combined first signals are generated whose signal pitch is small. In a similar manner, the second signals due to the second reading out are combined with the second signals due to the first reading out in step S160, and thereby combined second signals are generated whose signal pitch is small.

In step S180, the microprocessor 9 causes the focus calculation unit 10 to perform image deviation detection calculation processing. Due to this, as shown by way of example in FIG. 14C, the focus calculation unit 10 calculates the defocusing amount on the basis of the group "a" signals which consist of a plurality of combined first signals and also the group "b" signals which consist of a plurality of combined second signals.

In step S190, the microprocessor 9 makes a decision as to whether or not the defocusing amount is within a second permitted value. This second permitted value is a smaller value than the first permitted value described above, and corresponds to the case in which it can be determined that the photographic subject is properly in focus. If the defocusing amount is within the second permitted value, then the microprocessor 9 terminates the processing of FIG. 15. On the other hand if, for example due to movement of the photographic subject or the like, the defocusing amount exceeds the second permitted value, then the flow of control returns to step S150 and the processing described above is repeated.

In this fifth embodiment, the camera 1 employs the first mode when the defocusing amount is large, and employs the second mode when the defocusing amount is small. In other words, when the defocusing amount is large, focus adjustment is performed at high speed in the first mode, whereas, when the defocusing amount is small, focus adjustment is performed with good accuracy in the second mode. Due to this, along with shortening the time period required for focus adjustment, also it is possible to perform focus adjustment at high accuracy.

A second example of the operation of the fifth embodiment will now be explained.

A Second Example

In this second example, the first mode is employed if the speed of movement of the photographic subject is greater than a predetermined value, while the second mode is employed if the speed of movement of the photographic subject is less than or equal to the predetermined value. Since, in the first mode, the focus adjustment calculation is performed on the basis of the first signals and the second signals due to the first reading out (or due to the second reading out), accordingly the time period required for reading out the signals is shorter than in the first mode. Moreover since, in the first mode, the numbers of the first and second signals that are employed in the focus adjustment calculation is smaller than in the first mode, accordingly the focus adjustment calculation can be performed at higher speed than in the second mode. And since, in the second mode, the focus adjustment calculation is performed on the basis of the first signals and the second signals due both to the first reading out and also to the second reading out, accordingly the accuracy of focus adjustment becomes higher than in the first mode. In other words, since in the second mode the numbers of the first and second signals that are employed in the focus adjustment calculation is greater than in the first mode, accordingly the focus adjustment calculation can be performed with better accuracy than in the first mode. Therefore the first mode is appropriate for use when photographing a subject whose speed of movement is high, and the second mode is appropriate for use when photographing other photographic subjects.

Figure 16:
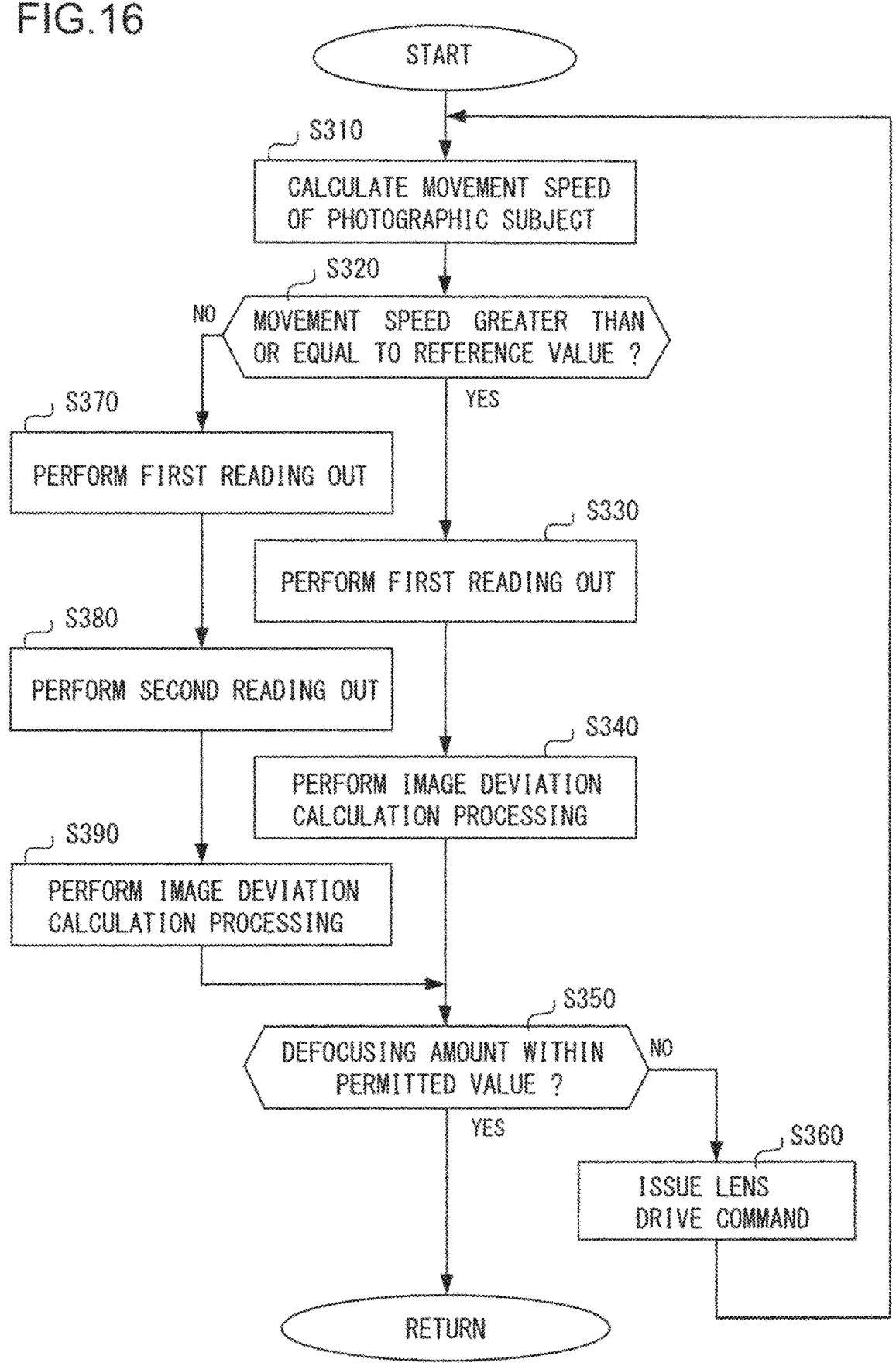
FIG. 16 is a flow chart for explanation of a flow of processing executed by the microprocessor.

FIG. 16 is a flow chart for explanation of the flow of processing that is executed by the microprocessor 9 when issuing a command to the imaging control unit 4 for focus adjustment. The microprocessor 9 starts the processing shown in FIG. 16 when, for example, an actuation signal is inputted from the actuation unit 9a showing that the release button has been actuated by being half pressed.

In step S310, the microprocessor 9 calculates the speed of movement of the photographic subject as it shifts over the screen. For example, the distance through which the photographic subject moves as it shifts over the screen may be calculated by comparing together before and after frame images of the monitor video image that is being acquired by the image sensor 3 at 60 fps. And then the movement speed may be calculated by dividing this distance of movement by the frame interval (16.7 msec in the case of 60 fps).

In step S320, the microprocessor 9 makes a decision as to whether or not the speed of movement is greater than or equal to a reference value. This reference value, for example, may correspond to the case when it can be determined that the photographic subject is almost stationary. If the speed of movement is greater than or equal to the reference value, then the microprocessor 9 reaches an affirmative decision in step S320 so that it is determined that focus adjustment should be performed quickly in the first mode for this moving photographic subject, and the flow of control proceeds to step S330. On the other hand, if the speed of movement is less than the reference value, then the microprocessor 9 reaches a negative decision in step S320 so that it is determined that focus adjustment should be performed with good accuracy in the second mode for this photographic subject that is almost stationary, and the flow of control is transferred to step S370.

When the focus adjustment is to be performed quickly in the first mode, in step S330, the microprocessor 9 causes the imaging control unit 4 to perform the first reading out. Due to this first reading out, the first signals are read out from the pixels 20G of type P, and the second signals are read out from the pixels 20G of type S.

It should be understood that the second reading out may be performed instead of the first reading out. In this second reading out, the second signals are read out from the pixels 20G of type P, and the first signals are read out from the pixels 20G of type S.

In step S340, the microprocessor 9 causes the focus calculation unit 10 to perform image deviation detection calculation processing. Due to this, as shown by way of example in FIG. 14A, the focus calculation unit 10 calculates the defocusing amount on the basis of the group "a" signals which consist of a plurality of first signals and the group "b" signals which consist of a plurality of second signals. When the second reading out has been performed in step S330, as shown by way of example in FIG. 14B, the focus calculation unit 10 calculates the defocusing amount on the basis of the group "a" signals and the group "b" signals. Since, in this manner, the focus adjustment in the first mode is performed rapidly, accordingly it is possible quickly to focus upon a photographic subject that is moving at high speed.

In step S350, the microprocessor 9 makes a decision as to whether or not the defocusing amount is within a permitted value. This permitted value is a value that corresponds to the case in which it can be decided that the photographic subject is properly focused. If the defocusing amount is within the first permitted value, then the microprocessor 9 terminates the processing of FIG. 16. On the other hand, if the defocusing amount exceeds the permitted value, then the flow of control proceeds to step S360.

In step S360, the microprocessor 9 sends a lens drive command to the lens control unit 2a. Due to this, the lens control unit 2a shifts the focusing lens for focus adjustment on the basis of the defocusing amount that was calculated in step S340. When the focusing lens is shifted, the microprocessor 9 returns the flow of control to step S310 and repeats the processing described above.

If in step S320 the speed of movement is less than the reference value, then in step S370 the microprocessor 9 causes the imaging control unit 4 to perform the first reading out. Due to this first reading out, the first signals are read out from the pixels 20G of type P, and the second signals are read out from the pixels 20G of type S.

And, in step S380, the microprocessor 9 causes the imaging control unit 4 to perform the second reading out. Due to this second reading out, the second signals are read out from the pixels 20G of type P, and the first signals are read out from the pixels 20G of type S. The first signals from this second reading out are combined with the first signals due to the first reading out in step S160, and thereby combined first signals are generated whose signal pitch is small. In a similar manner, the second signals due to the second reading out are combined with the second signals due to the first reading out in step S160, and thereby combined second signals are generated whose signal pitch is small.

In step S390, the microprocessor 9 causes the focus calculation unit 10 to perform image deviation detection calculation processing. Due to this, as shown by way of example in FIG. 14C, the focus calculation unit 10 calculates the defocusing amount on the basis of the group "a" signals which consist of a plurality of combined first signals and the group "b" signals which consist of a plurality of combined second signals. When the defocusing amount has been calculated by the focus calculation unit 10, the microprocessor 9 transfers the flow of control to step S350 described above.

In this second mode, since the signal pitch of the focus detection signals, in other words the signal pitch of the combined first and second signals, is small, in other words, the resolution is high, focus adjustment at high accuracy becomes possible.

A Third Example

Figure 17:
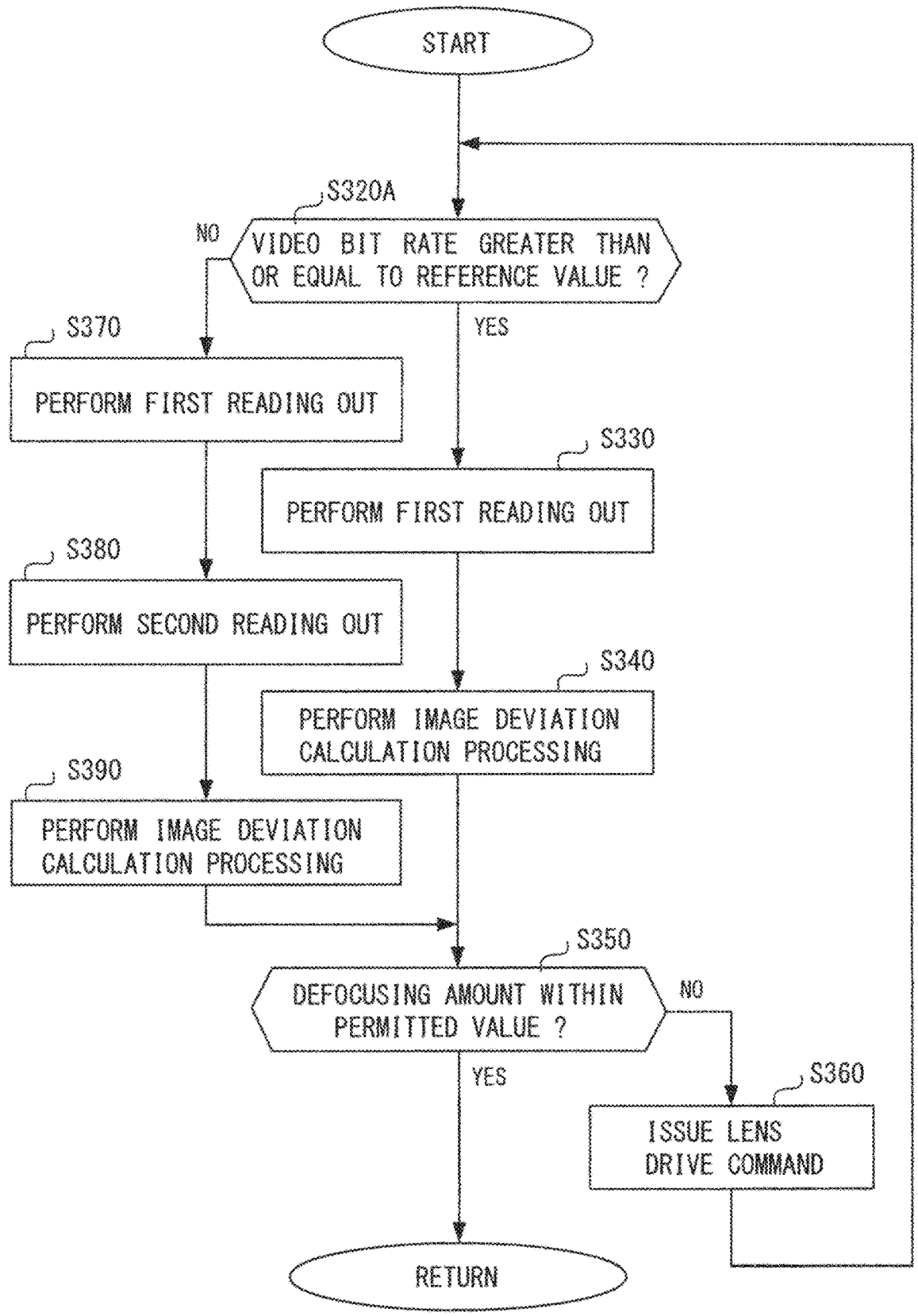
FIG. 17 is a flow chart for explanation of a flow of processing executed by the microprocessor.

In this third example, changeover between the first mode and the second mode is performed according to the amount or the number of image data items outputted from the image sensor per unit time period. For example, changeover between the first mode and the second mode may be performed according to the video bit rate. The video bit rate is the number of data items (i.e. the number of bits) of the image sent during one second, and increases as the number of bits making up the image data becomes greater. Due to this, the higher is the image quality set for the camera 1 and the higher is the number of frames per second (fps), the higher is the video bit rate. FIG. 17 is a flow chart for explanation of the flow of processing that is executed by the microprocessor 9 when issuing a command to the imaging control unit 4 for focus adjustment. In FIG. 17, processes that are similar to processes of FIG. 16 are denoted by the same step numbers, and explanation thereof will be curtailed.

The microprocessor 9 starts the processing shown in FIG. 17 when, for example, an actuation signal is inputted from the actuation unit 9a showing that the release button has been actuated by being half pressed.

In step S320A, the microprocessor 9 makes a decision as to whether or not the video bit rate is greater than or equal to a reference value. For example, the video bit rate may correspond to this reference value or greater if the total bit rate obtained by adding the focus adjustment signal in the second mode to the video bit rate exceeds the processing capability of the image sensor 3. If the video bit rate is greater than or equal to the reference value, then focus adjustment should be performed quickly in the first mode, and the microprocessor 9 reaches an affirmative decision in step S320A and the flow of control proceeds to step S330. On the other hand, if the video bit rate does not exceed the reference value, then focus adjustment should be performed at good accuracy in the second mode, and a negative decision is reached in step S320A and the flow of control is transferred to step S370.

The other processing in FIG. 17 is the same as the processing of FIG. 6 of the second example.

The microprocessor 9 selects one of the types of processing described above in the first through the third example. For example, the microprocessor 9 may select the processing of the first example, of the second example, or of the third example on the basis of an actuation signal from the actuation unit 9a.

Moreover, the microprocessor 9 may also choose the processing of the first example, of the second example, or of the third example automatically, according to the scene imaging mode that is set for the camera 1. For example, the microprocessor 9 may choose the processing of the first example when the camera 1 is set to "landscape", "cooking", "flower", "portrait", or a similar imaging mode. Furthermore, the microprocessor 9 may choose the processing of the second example when the camera 1 is set to "sports" or a similar imaging mode. Even further, the microprocessor 9 may choose the processing of the third example when the camera 1 is set to the video photographic mode.

According to the fifth embodiment explained above, the following operations and beneficial effects are obtained.

(1) In this camera 1, which is an example of an imaging device, the microprocessor 9 has: a first mode in which it controls the position of the focusing lens on the basis of the first signals based upon the first charges of the pixels 20G (P) and the second signals based upon the second charges of the pixels 20G (P), or on the basis of the second signals based upon the second charges of the pixels 20G (P) and the first signals based upon the first charges of the pixels 20G(S); and a second mode in which it controls the position of the focusing lens on the basis of the first signals based upon the first charges and the second signals based upon the second charges of the pixels 20G (P), and the first signals based upon the first charges and the second signals based upon the second charges of the pixels 20G(S). Due to this, in the first mode it is possible to perform focus adjustment quickly, and in the second mode it is possible to perform focus adjustment with good accuracy.

(2) In the camera 1, the microprocessor 9 changes over between the first mode and the second mode on the basis of the movement speed of the photographic subject, or on the basis of the amount of data or the number of data items (i.e. the bit rate) per unit time period of the signal outputted from the image sensor, or on the basis of the amount of deviation between the image focusing surface upon which an image is formed by the photographic lens 2, and the imaging surface of the image sensor 3. Due to this, it is possible to change over between the first mode and the second mode in an appropriate manner.

Variant Embodiments

It would also be acceptable to apply the image sensor explained in connection with the first through fifth embodiments described above and their variants to a laminated sensor (i.e. a laminated type image sensor) that is built from a plurality of substrates (for example, a plurality of semiconductor substrates) that are laminated together. For example: the plurality of pixels 20 may be disposed upon a first layer substrate; the vertical scan circuit 21, the horizontal scan circuit 22, the CDS circuits 27, and the output amp 29 may be disposed upon a second layer substrate; and the plurality of vertical signal lines 25 may be disposed between the first layer substrate and the second layer substrate.

Furthermore, the plurality of pixels 20, the vertical scan circuit 21, and the horizontal scan circuit 22 may all be disposed on the first layer substrate, with the CDS circuits 27 and the output amp 29 being disposed on the second layer substrate.

Even further, such a laminated sensor may incorporate three or more layers laminated together.

While various embodiments and variant embodiments have been explained in the above description, the present invention is not to be considered as being limited to the details thereof. Other variations that are considered to come within the range of the technical concept of the present invention are also included within the scope of the present invention.

The content of the disclosure of the following application, upon which priority is claimed, is herein incorporated by reference.

Japanese Patent Application No. 2017-75177 (filed on Apr. 5, 2017).

REFERENCE SIGNS LIST

1: camera
2: image capturing optical system
3: image sensor
9: microprocessor
10: focus calculation unit
13: image processing unit
20, 20G, 20R, 20B: pixels
21: vertical scan circuit
22: horizontal scan circuit
23, 24: control signal lines
25: vertical signal line
AMP: amplification transistor
FD: FD region PD-1, PD-2: photodiodes
SEL: selection transistor
Tx-1, Tx-2: transfer transistors

The invention claimed is:
1. An imaging device, comprising:
a first pixel including:
   a first microlens onto which light from an optical system is incident;
   a first photoelectric converter that converts light from the first microlens into a charge;
   a second photoelectric converter that converts light from the first microlens into a charge, the second photoelectric converter being arranged adjacent to the first photoelectric converter in a first direction;
   a first transfer unit that transfers the charge converted by the first photoelectric converter; and
   a second transfer unit that transfers the charge converted by the second photoelectric converter;
a second pixel including:
   a second microlens onto which light from the optical system is incident, the second microlens being arranged in line with the first microlens in the first direction;
   a third photoelectric converter that converts light from the second microlens into a charge;
   a fourth photoelectric converter that converts light from the second microlens into a charge, the fourth photoelectric converter being arranged adjacent to the third photoelectric converter in the first direction;
   a third transfer unit that transfers the charge converted by the third photoelectric converter; and
   a fourth transfer unit that transfers the charge converted by the fourth photoelectric converter;
a third pixel including:
   a third microlens onto which light from the optical system is incident, the third microlens being arranged in line with the first microlens in a second direction intersecting the first direction;
   a fifth photoelectric converter that converts light from the third microlens into a charge;
   a sixth photoelectric converter that converts light from the third microlens into a charge, the sixth photoelectric converter being arranged adjacent to the fifth photoelectric converter in the first direction;
   a fifth transfer unit that transfers the charge converted by the fifth photoelectric converter; and
   a sixth transfer unit that transfers the charge converted by the sixth photoelectric converter;
a fourth pixel including:
   a fourth microlens onto which light from the optical system is incident, the fourth microlens being arranged in line with the third microlens in the first direction and being arranged in line with the second microlens in the second direction;
   a seventh photoelectric converter that converts light from the fourth microlens into a charge;
   an eighth photoelectric converter that converts light from the fourth microlens into a charge, the eighth photoelectric converter being arranged adjacent to the seventh photoelectric converter in the first direction;
   a seventh transfer unit that transfers the charge converted by the seventh photoelectric converter; and
   an eighth transfer unit that transfers the charge converted by the eighth photoelectric converter;
a first control line electrically connected to the first transfer unit and the fourth transfer unit and through which a first control signal for controlling the first transfer unit and the fourth transfer unit is output;
a second control line electrically connected to the second transfer unit and the third transfer unit and through which a second control signal for controlling the second transfer unit and the third transfer unit is output;
a third control line electrically connected to the fifth transfer unit and the eighth transfer unit and through which a third control signal for controlling the fifth transfer unit and the eighth transfer unit is output;
a fourth control line electrically connected to the sixth transfer unit and the seventh transfer unit and through which a fourth control signal for controlling the sixth transfer unit and the seventh transfer unit is output; and
a control unit that performs focus adjustment of the optical system using (i) a signal that is based on the charge transferred from the first photoelectric converter in response to the first control signal output to the first control line, (ii) a signal that is based on the charge transferred from the fourth photoelectric converter in response to the first control signal output to the first control line, (iii) a signal that is based on the charge transferred from the sixth photoelectric converter in response to the fourth control signal output to the fourth control line, and (iv) a signal that is based on the charge transferred from the seventh photoelectric converter in response to the fourth control signal output to the fourth control line.

2. The imaging device according to claim 1, wherein:
the control unit performs focus adjustment of the optical system using (v) a signal that is based on the charge transferred from the second photoelectric converter in response to the second control signal output to the second control line, (vi) a signal that is based on the charge transferred from the third photoelectric converter in response to the second control signal output to the second control line, (vii) a signal that is based on the charge transferred from the fifth photoelectric converter in response to the third control signal output to the third control line, and (viii) a signal that is based on the charge transferred from the eighth photoelectric converter in response to the third control signal output to the third control line.

3. The imaging device according to claim 2, wherein:
the control unit generates image data using (i) a signal that is based on the charge transferred from the first photoelectric converter in response to the first control signal output to the first control line and the charge transferred from the second photoelectric converter in response to the second control signal output to the second control line; (ii) a signal that is based on the charge transferred from the third photoelectric converter in response to the second control signal output to the second control line and the charge transferred from the fourth photoelectric converter in response to the first control signal output to the first control line; (iii) a signal that is based on the charge transferred from the fifth photoelectric converter in response to the third control signal output to the third control line and the charge transferred from the sixth photoelectric converter in response to the fourth control signal output to the fourth control line; and (iv) a signal that is based on the charge transferred from the seventh photoelectric converter in response to the fourth control signal output to the fourth control line and the charge transferred from the eighth photoelectric converter in response to the third control signal output to the third control line.

4. The imaging device according to claim 1, wherein:

the control unit generates image data using (i) a signal that is based on the charge transferred from the first photoelectric converter in response to the first control signal output to the first control line and the charge transferred from the second photoelectric converter in response to the second control signal output to the second control line; (ii) a signal that is based on the charge transferred from the third photoelectric converter in response to the second control signal output to the second control line and the charge transferred from the fourth photoelectric converter in response to the first control signal output to the first control line; (iii) a signal that is based on the charge transferred from the fifth photoelectric converter in response to the third control signal output to the third control line and the charge transferred from the sixth photoelectric converter in response to the fourth control signal output to the fourth control line; and (iv) a signal that is based on the charge transferred from the seventh photoelectric converter in response to the fourth control signal output to the fourth control line and the charge transferred from the eighth photoelectric converter in response to the third control signal output to the third control line.

5. The imaging device according to claim 1, wherein:

the first pixel includes a first accumulation unit to which the charge converted by the first photoelectric converter and the charge converted by the second photoelectric converter are transferred;

the second pixel includes a second accumulation unit to which the charge converted by the third photoelectric converter and the charge converted by the fourth photoelectric converter are transferred;

the third pixel includes a third accumulation unit to which the charge converted by the fifth photoelectric converter and the charge converted by the sixth photoelectric converter are transferred; and the fourth pixel includes a fourth accumulation unit to which the charge converted by the seventh photoelectric converter and the charge converted by the eighth photoelectric converter are transferred.

6. The imaging device according to claim 1, further comprising:

a first signal line electrically connected to the first pixel and the third pixel; and a second signal line electrically connected to the second pixel and the fourth pixel.

7. The imaging device according to claim 1, further comprising:

a scan circuit that outputs the first control signal, the second control signal, the third control signal, and the fourth control signal.

8. The imaging device according to claim 7, wherein:

the first photoelectric converter, the second photoelectric converter, the third photoelectric converter, the fourth photoelectric converter, the fifth photoelectric converter, the sixth photoelectric converter, the seventh photoelectric converter, and the eighth photoelectric converter are disposed on a first semiconductor substrate; and the scan circuit is disposed on a second semiconductor substrate stacked together with the first semiconductor substrate.

9. The imaging device according to claim 8, further comprising:

a first signal line electrically connected to the first pixel and the third pixel; and a second signal line electrically connected to the second pixel and the fourth pixel.

10. The imaging device according to claim 9, wherein:

the first signal line and the second signal line are disposed between the first semiconductor substrate and the second semiconductor substrate in a stacking direction in which the first semiconductor substrate and the second semiconductor substrate are stacked.

* * * * *